United States Patent [19]
Will

[11] Patent Number: 6,167,117
[45] Date of Patent: *Dec. 26, 2000

[54] VOICE-DIALING SYSTEM USING MODEL OF CALLING BEHAVIOR

[75] Inventor: Craig A. Will, Fremont, Calif.

[73] Assignee: Nortel Networks Limited, Canada

[*] Notice: This patent is subject to a terminal disclaimer.

[21] Appl. No.: 08/942,201

[22] Filed: Oct. 1, 1997

Related U.S. Application Data

[63] Continuation-in-part of application No. 08/726,604, Oct. 7, 1996, Pat. No. 5,917,891.

[51] Int. Cl.[7] ................................................ H04M 3/00
[52] U.S. Cl. .................................. 379/88.03; 379/88.01; 704/255
[58] Field of Search .................................. 704/251, 252, 704/255, 256, 257, 275; 379/67.1, 88.01, 88.02, 88.03, 142, 201, 355, 356, 357

[56] References Cited

U.S. PATENT DOCUMENTS

| | | |
|---|---|---|
| 3,742,143 | 6/1973 | Awipi . |
| 4,313,035 | 1/1982 | Jordan et al. . |
| 4,348,550 | 9/1982 | Pirz et al. . |
| 4,593,157 | 6/1986 | Usdan . |
| 4,731,811 | 3/1988 | Dubus . |
| 4,737,976 | 4/1988 | Borth et al. . |
| 4,752,951 | 6/1988 | Konneker . |
| 4,827,500 | 5/1989 | Binkerd et al. . |
| 4,829,576 | 5/1989 | Porter . |
| 4,853,953 | 8/1989 | Fujisaki . |
| 4,864,622 | 9/1989 | Iida et al. . |
| 4,924,496 | 5/1990 | Figa et al. ................................ 379/142 |
| 4,928,302 | 5/1990 | Kaneuchi et al. ................... 379/88.03 |
| 4,945,557 | 7/1990 | Kaneuchi et al. . |
| 4,959,850 | 9/1990 | Marui . |
| 4,959,855 | 9/1990 | Daudelin . |

(List continued on next page.)

FOREIGN PATENT DOCUMENTS

| | | |
|---|---|---|
| 0 269 364 | 6/1988 | European Pat. Off. . |
| 0 269 364 A2 | 6/1988 | European Pat. Off. . |
| 0 408 041 A2 | 1/1991 | European Pat. Off. . |

(List continued on next page.)

OTHER PUBLICATIONS

VCS 2030 2060 Voice Dialer User Manual, p. 1–17.
Voice Dial Information.
"Bell Atlantic Nynex Mobile Debuts Unique Voice Dialing Service, Talkdial," Bell Atlantic News Release, Feb. 15, 1996.

(List continued on next page.)

*Primary Examiner*—Daniel S. Hunter
*Assistant Examiner*—Roland G. Foster
*Attorney, Agent, or Firm*—Finnegan, Henderson, Farabow, Garrett & Dunner, L.L.P.

[57] ABSTRACT

A method and apparatus for assisting voice-dialing using a model of an individual's calling behavior to improve recognition of an input name corresponding a desired telephone number. When the individual picks up a telephone, activity is initiated in a neural network model of the individual's calling behavior that predicts the likelihood that different numbers will be called, given such predictors as the day of the week and the time of day. The model is constructed by training the neural network with data from the user's history of making and receiving telephone calls. The auditory output from an automatic speech recognition system and the output from the user model are integrated together so as to select the number that is most likely to be the number desired by the speaker. The system can also provide automatic directory assistance, by speaking the number aloud rather than dialing it. In one version, the system is a personal directory for an individual maintained on that individual's personal computer. In another version, the system serves as a directory for a given physical or virtual site, with information about the institutional organization at the site in addition to individual calling histories used to track calling patterns and make predictions about the likelihood of calls within the site.

44 Claims, 16 Drawing Sheets

U.S. PATENT DOCUMENTS

| | | |
|---|---|---|
| 4,961,212 | 10/1990 | Marui et al. . |
| 4,979,206 | 12/1990 | Padden et al. . |
| 5,007,081 | 4/1991 | Schmuckal et al. . |
| 5,018,201 | 5/1991 | Sugawara ................................. 704/252 |
| 5,042,063 | 8/1991 | Sakanishi et al. . |
| 5,054,053 | 10/1991 | Sakanishi et al. . |
| 5,111,501 | 5/1992 | Shimanuki . |
| 5,155,763 | 10/1992 | Bigus et al. . |
| 5,163,081 | 11/1992 | Wycherley et al. . |
| 5,165,095 | 11/1992 | Borcherding . |
| 5,168,548 | 12/1992 | Kaufman et al. . |
| 5,181,237 | 1/1993 | Dowden et al. . |
| 5,182,765 | 1/1993 | Ishii et al. . |
| 5,185,781 | 2/1993 | Dowden et al. . |
| 5,187,735 | 2/1993 | Garcia et al. . |
| 5,204,894 | 4/1993 | Darden . |
| 5,222,121 | 6/1993 | Shimada . |
| 5,230,017 | 7/1993 | Alexander ............................... 379/140 |
| 5,243,645 | 9/1993 | Bissell et al. ........................... 379/211 |
| 5,267,308 | 11/1993 | Jokinen et al. ......................... 379/354 |
| 5,274,699 | 12/1993 | Ranz ....................................... 379/142 |
| 5,301,227 | 4/1994 | Kamel et al. . |
| 5,313,516 | 5/1994 | Afshar et al. ............................. 379/67 |
| 5,315,649 | 5/1994 | Foster et al. . |
| 5,325,421 | 6/1994 | Hou et al. . |
| 5,329,578 | 7/1994 | Brennan et al. . |
| 5,333,184 | 7/1994 | Doherty et al. ......................... 379/115 |
| 5,335,261 | 8/1994 | Fujinaka . |
| 5,353,330 | 10/1994 | Fujiwara . |
| 5,353,336 | 10/1994 | Hou et al. . |
| 5,357,596 | 10/1994 | Takebayashi et al. .................. 704/275 |
| 5,369,685 | 11/1994 | Kero .......................................... 379/67 |
| 5,371,779 | 12/1994 | Kobayashi . |
| 5,392,342 | 2/1995 | Rosenthal . |
| 5,394,464 | 2/1995 | Hanson et al. . |
| 5,398,279 | 3/1995 | Frain ....................................... 379/140 |
| 5,414,759 | 5/1995 | Ishikuri et al. . |
| 5,430,791 | 7/1995 | Feit et al. . |
| 5,452,340 | 9/1995 | Engelbeck et al. . |
| 5,452,397 | 9/1995 | Ittycheriah et al. . |
| 5,465,401 | 11/1995 | Thompson . |
| 5,467,383 | 11/1995 | Urasaka et al. ........................... 379/61 |
| 5,479,488 | 12/1995 | Lennig et al. ............................. 379/67 |
| 5,479,489 | 12/1995 | O'Brien . |
| 5,483,579 | 1/1996 | Stogel . |
| 5,487,111 | 1/1996 | Slusky . |
| 5,488,652 | 1/1996 | Bielby et al. ............................. 379/88 |
| 5,509,058 | 4/1996 | Sestak et al. ........................... 379/201 |
| 5,509,103 | 4/1996 | Wang ..................................... 395/2.41 |
| 5,524,145 | 6/1996 | Parker ..................................... 379/197 |
| 5,553,125 | 9/1996 | Martensson ............................ 379/140 |
| 5,568,546 | 10/1996 | Marutiak ................................. 379/355 |
| 5,581,611 | 12/1996 | Yunoki ................................... 379/211 |
| 5,583,564 | 12/1996 | Rao et al. . |
| 5,592,546 | 1/1997 | Takahashi ............................... 379/355 |
| 5,600,704 | 2/1997 | Ahlberg et al. . |
| 5,638,425 | 6/1997 | Meador, III et al. ..................... 379/88 |
| 5,642,411 | 6/1997 | Theis ...................................... 379/266 |
| 5,668,862 | 9/1997 | Bannister et al. ...................... 379/201 |
| 5,684,868 | 11/1997 | Alexander .............................. 379/140 |
| 5,706,339 | 1/1998 | Eisdorfer et al. ....................... 379/211 |
| 5,712,957 | 1/1998 | Waibel et al. .......................... 704/240 |
| 5,717,738 | 2/1998 | Gammel ............................... 379/88.03 |
| 5,719,921 | 2/1998 | Vysotsky et al. ......................... 379/88 |
| 5,724,411 | 3/1998 | Eisdorfer et al. .................... 379/93.23 |
| 5,742,674 | 4/1998 | Jain et al. ............................... 379/209 |
| 5,917,891 | 6/1999 | Will ..................................... 379/88.03 |

FOREIGN PATENT DOCUMENTS

| | | |
|---|---|---|
| 0 431 890 A2 | 12/1991 | European Pat. Off. . |
| 0 477 854 A2 | 1/1992 | European Pat. Off. . |
| 0 493 292 A2 | 1/1992 | European Pat. Off. . |
| 06014098 | 1/1994 | European Pat. Off. . |
| 0 647 075 A2 | 4/1995 | European Pat. Off. . |
| 07282203 | 10/1995 | European Pat. Off. . |
| 07283858 | 10/1995 | European Pat. Off. . |
| 07320001 | 12/1995 | European Pat. Off. . |
| 0 709 996 A2 | 1/1996 | European Pat. Off. . |
| 38 37 385 A1 | 5/1989 | Germany . |
| 3837385 | 5/1989 | Germany . |
| 06121014 | 4/1994 | Japan . |
| 07095279 | 7/1995 | Japan . |
| 07336426 | 12/1995 | Japan . |
| 2 293 521 | 3/1996 | United Kingdom . |
| 2 292 043 | 7/1996 | United Kingdom . |
| 2315191 | 1/1998 | United Kingdom . |
| WO 87/07460 | 12/1987 | WIPO . |
| WO 94/14270 | 6/1994 | WIPO . |
| WO 96/07286 | 3/1996 | WIPO . |
| WO 96/38971 | 12/1996 | WIPO . |
| WO 97/19546 | 5/1997 | WIPO . |
| WO 97/37499 | 10/1997 | WIPO . |

OTHER PUBLICATIONS

Rumelhart, David E. et al., Parallel Distributed Processing; Explorations in the Microstructure of Cognition, Chapter 8: "Learning Internal Representations by Error Propagation," vol.: Foundations, 1986, pp. 318–362.

Rosenberg, A.E. and Schmidt, C.E., The Bell System Technical Journal, "Automatic Recognition of Spoken Spelled Names for Obtaining Directory Listings," Oct. 1979, pp. 1797–1823.

Rabiner, L.R., et al., The Bell Systems Technical Journal, "A Voice–Controlled, Repertory–Dialer System," Sep. 1980, pp. 1153–1163.

Mark Fanty et al., "City Name Recognition Over The Telephone," pp. I–549–I552, 0–7803–0946–4/93, Apr. 27, 1993 IEEE.

| DATE OF CALL | DAY OF WEEK | TIME OF DAY | NUMBER | IN/OUT | HOW ANSWERED | DURATION OF CALL |
|---|---|---|---|---|---|---|
| 9-22-96 | 2 | 4 | 408 427-8732 | 0 | 0 | 1 |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |

FIG. 7

| NUMBER AND MATCH QUALITY | | NUMBER AND MATCH QUALITY | | NUMBER AND MATCH QUALITY | | CORRECT NUMBER |
|---|---|---|---|---|---|---|
| 510 745-8224 | .54 | 408 427-8732 | .46 | 617 238-2189 | .23 | 408 427-8732 |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |
|  |  |  |  |  |  |  |

FIG. 8

VOICE-DIALING SYSTEM USING MODEL OF CALLING BEHAVIOR

RELATED APPLICATIONS

This application is a continuation-in-part of U.S. patent application Ser. No. 08/726,604, entitled "Voice-Dialing System Using Model of Calling Behavior," filed Oct. 7, 1996, now U.S. Pat. No. 5,917,891, the entire contents of which are incorporated herein.

BACKGROUND OF THE INVENTION

1. Field of the Invention

This invention relates generally to systems for telephonic communications with audio message storage and retrieval and, more particularly, to telephonic communications involving repertory or abbreviated call signal generation and abbreviated dialing. The invention further relates to systems based on artificial intelligence techniques, particularly those using knowledge processing, and especially to adaptive or trainable systems that create sets of rules and use parallel distributed processing components.

2. Description of the Related Art

Both rotary and touch-tone dialing rely on telephone numbers to initiate desired telephone connections. Telephone companies use the numbers to route calls, but people now depend on the numbers for all telephone communications. This is somewhat unnatural because people generally select those with whom they would like to talk by name or other convention. Indeed, telephone directories are arranged by name, not number.

Some companies started to develop voice-activated dialing systems to replace touch-tone dialing. In such systems, telephone users speak the name of an individual or destination into the microphone of a telephone handset to initiate a telephone call. Voice-dialing thus allows connection to be made directly, avoiding the step of looking up names to locate corresponding telephone numbers.

Examples of experimental voice-dialing systems appear in L. R. Rabiner, J. G. Wilpon, and A. E. Rosenberg, "A voice-controlled, repertory-dialer system," Bell System Technical Journal, Vol. 59, No. 7 (September, 1980), and U.S. Pat. No. 4,348,550 to Pirz et al. These systems have limited accuracy and speed and cost a great deal of money.

Recent advances in speech recognition have improved performance dramaticaly, particularly for systems that are not trained to a particular speaker that have, until recently, performed worse than systems trained to particular speakers. In addition, the increasing computational and memory capacity and decreasing cost of computing hardware improve the commercial viability for simpler applications of speech recognition such as voice-dialing.

Limitations on the performance of voice-dialing systems, however, still significantly reduce their commercial applicability. Such systems frequently make errors, with the rate of errors increasing with increased vocabulary size and factors such as environmental noise, unusual accents, and the use of foreign or unusual names that are difficult to pronounce consistently. The limited accuracy of recognition performance resulting from these factors restricts the possible range of applications for conventional voice-dialing systems by limiting the vocabulary, environment, user population, and hardware platforms on which the systems can run.

It is therefore desirable to seek techniques that will improve the accuracy and speed of speech recognition performance in voice-dialing systems. A number of alternative techniques have been used in the past. One approach is to ask the user for verification before dialing ("Did you say Anatoly Korsakov?"), and presenting a different name if the user says "No." See, for example, U.S. Pat. No. 5,222,121 to Shimada. Another approach, disclosed by Iida et al. (U.S. Pat. No. 4,864,622), modifies or replaces the voice template used for speech recognition when the template is not performing adequately.

None of these approaches, however, really improves speech recognition performance for voice-dialing systems. They merely require additional user interaction to assist in the voice-dialing process.

SUMMARY OF THE INVENTION

There is, therefore, a need to improve the speed and accuracy of voice-dialing systems. There is also a related need to allow such systems to adapt and learn.

The present invention meets these needs using a neural network that creates a model of the telephone calling behavior of an individual and uses this model to increase the performance of the automatic speech recognition system that matches incoming spoken names with names stored in a directory.

To achieve the objects and in accordance with the purpose of the invention, as embodied and broadly described herein, provides a method and apparatus for assisting voice-dialing by receiving voice input from a user representing a name corresponding to a desired telephone number, selecting stored names that most closely match the voice input, predicting a likelihood of the user calling-telephone numbers based on a model of the user's calling behavior, and determining the desired telephone number according to the predicted likelihood of the user calling the telephone number corresponding to each selected name.

BRIEF DESCRIPTION OF THE DRAWINGS

The accompanying drawings, which are incorporated in and constitute a part of this specification, illustrate preferred embodiments of the invention and, together with the description, explain the goals, advantages and principles of the invention. In the drawings.

FIG. 7 shows the data structure of historical call information used for training the calling behavior neural network according to the preferred embodiment of the voice-dialing system of the present invention;

FIG. 8 shows the data structure of historical call information used for training the integrator neural network according to the preferred embodiment of the voice-dialing system of the present invention;

DESCRIPTION OF THE PREFERRED EMBODIMENTS

Figure 1:
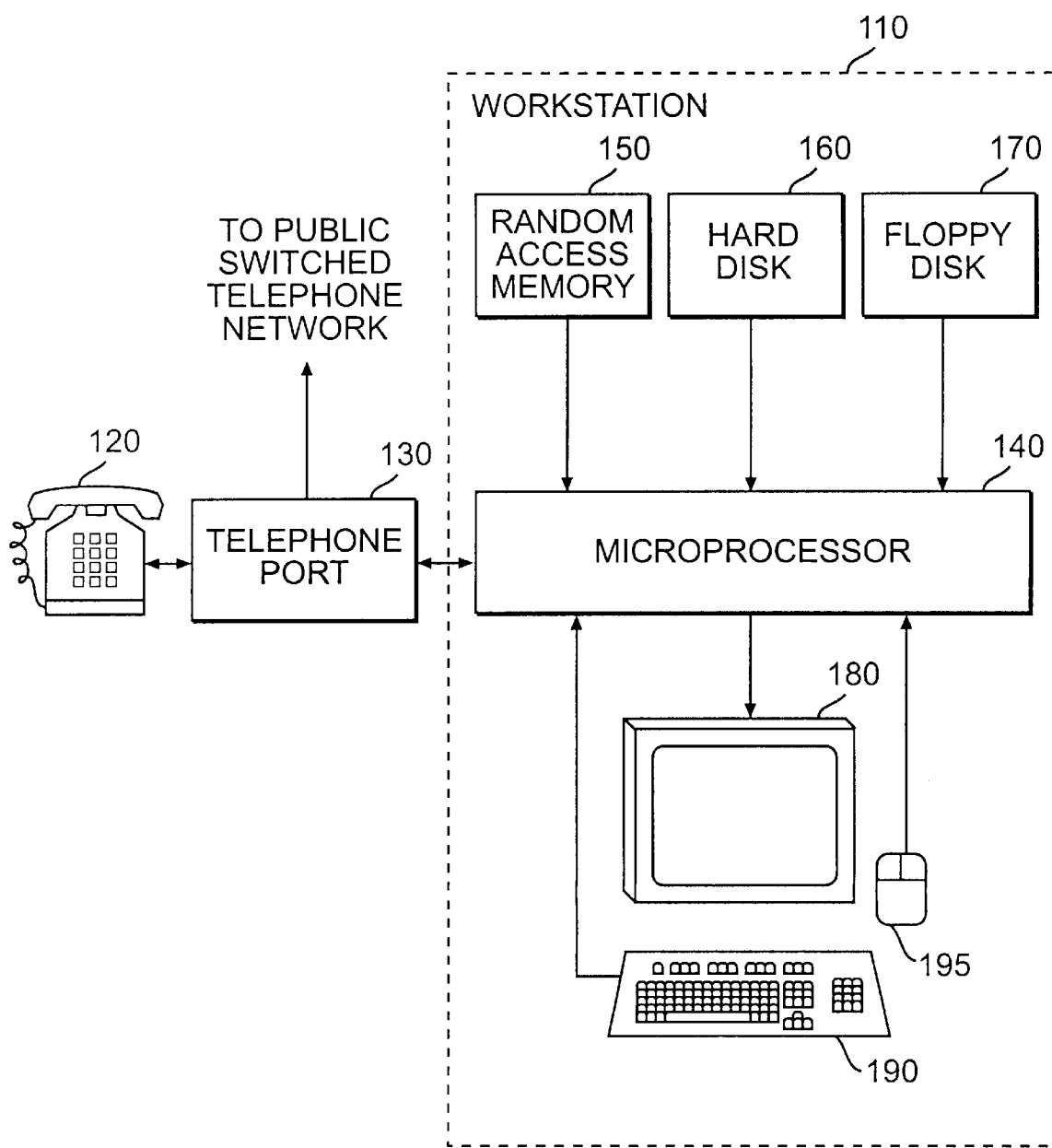
FIG. 1 is a block diagram of hardware architecture according to a preferred embodiment of the voice-dialing system of the present invention.

Reference will now be made in detail to the preferred implementation of the present invention as illustrated in the accompanying drawings. Wherever possible, the same reference numbers will be used throughout the drawings and the following description to refer to the same or like parts.

A voice-activated dialing system according to the present invention is built around a personal directory stored in the memory of a personal computer that holds names and associated telephone numbers. The system can be used either locally, by picking up a telephone and speaking the name associated with the desired number, or by connecting from a remote location and speaking the name. It may be implemented in a personal computer that is provided with a telephone interface card, as well as software to perform speech recognition and speech synthesis, to implement a neural network and dial a telephone number, and to control the voice-dialing system. It may also be used provide automatic directory assistance by speaking the number aloud rather than dialing it.

The architecture of the system consists of three components: a component that processes incoming speech and matches it against representations of the names in the personal directory, a component that models the user's calling behavior, and a component that integrates the outputs of the first two components to produce the name that the user most likely desires to call.

The user calling behavior model component consists of a multilayer feedforward neural network that uses the backward propagation learning algorithm. The inputs to the neural network accept the current date and time, while the output of the network provides a signal for each telephone number in the directory. The speech recognition component of the system processes an auditory input and a stored list of names in either a textual or auditory representation to provide a list of those names that best match the auditory signal and a measure of the quality of each match.

The component of the system that integrates the outputs of the first two components also consists of a multilayer feedforward neural network using backward propagation. The inputs to this neural network include one input for each telephone number in the directory from the output of the calling behavior model network, and one input for each telephone number from the output of the speech recognizer.

According to another aspect of the present invention, a voice-activated dialing system consists of a microprocessor-based server for a PBX system that implements a voice-dialing directory for a given physical or virtual site. The voice-dialing system makes use of three neural networks for a given individual, including the user calling behavior model and the integrator neural network. The third neural network is common to all individuals at the site, and implements a predictive model of calling between individuals at the site. This neural network is a multilayer feedforward neural network that uses the backward propagation learning algorithm. Every telephone number at the site corresponds to a category, with the category assignment made according to the structure of the organization at the site. The common network contains an input unit for each category and an output unit for each category.

A. Personal Directory System

1. Hardware Architecture

FIG. 1 shows the hardware architecture for a preferred embodiment of the voice-dialing system according to the present invention implemented as a personal directory system for an individual. Personal directory system 100 includes a workstation 110, which includes hardware for a standard personal computer (for example, an IBM compatible personal computer), together with some additions related to telephony, and an ordinary telephone 120 (for example, a touch-tone telephone). Alternatively, telephone 120 may be connected to workstation 110 when workstation 110 includes required voice input and output devices (not shown) that perform functions comparable to telephone 120.

Workstation 110 consists of microprocessor 140, random access memory (RAM) 150, hard disk 160, floppy disk and drive 170, video display 180, keyboard 190, and mouse 195. These may be standard off-the-shelf hardware. For example, microprocessor 140 may be a Pentium® processor manufactured by Intel Corp., USA, and video display 180 may be a NEC MultiSync 3V monitor manufactured by NEC Corp., Japan.

System 100 also includes telephone port 130 connecting the workstation 110 to a public switched telephone network. Alternatively, workstation 110 may be connected directly to a PBX via a digital connection for both voice and control signaling.

Telephone port 130 includes a switch, controlled by microprocessor 140 and also by DTMF tone receivers in the telephone port 130, to connect telephone 120 to the public switched telephone network or to microprocessor 140. Microprocessor 140 can also be connected directly to the public switched telephone network to allow dialing a number for an individual user. Telephone port 130 for use in a home or small office environment includes analog to digital and digital to analog converters and mechanisms to receive and transmit DTMF codes either via specialized hardware or with software.

All processing for the voice-dialing system may be done with microprocessor 140 as FIG. 1 shows. Workstation 110 may also include one or more specialized digital signal processing chips as coprocessors for linear predictive coding for speech recognition, format synthesis for speech synthesis, or processing and learning for a neural network.

2. Operation Overview

Figure 2:
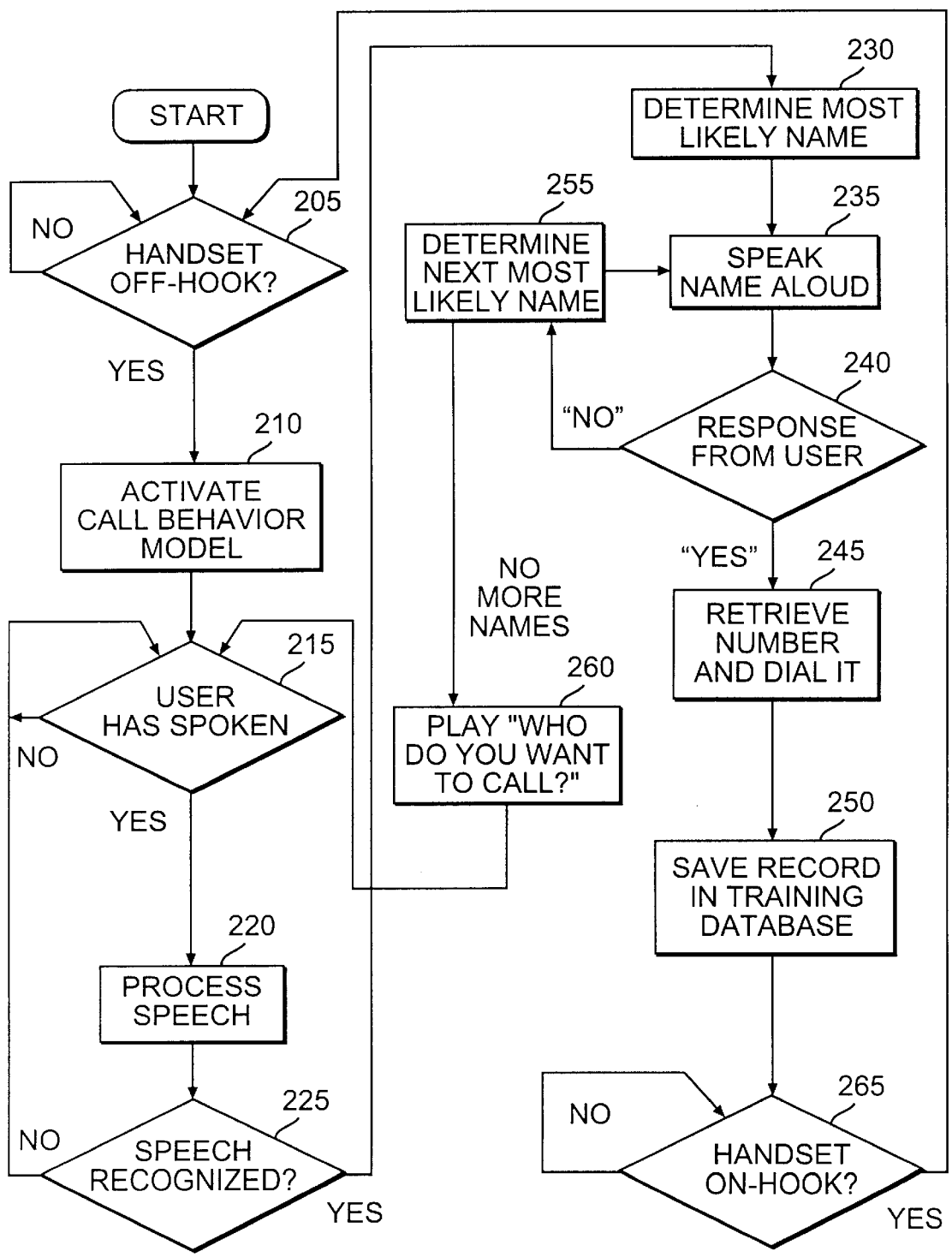
FIG. 2 is a functional flowchart of the process steps used to initiate telephone calls according to the preferred embodiment of the voice-dialing system of the present invention.

FIG. 2 shows a flowchart of a voice-dialing procedure 200. The steps of procedure 200 are implemented in software and use personal directory system 100 to control voice-dialing. The software, which may be stored in RAM 150, is executed by microprocessor 140.

The flow chart assumes that a user has previously created a database of names and associated telephone numbers. The database may be stored on hard disk 160. One such conventional software package that may be used to create such a database is Microsoft Schedule+®, manufactured by Microsoft Corporation.

The software for the voice-dialing procedure 200 runs as a background process on workstation 110, and microprocessor 140 periodically tests whether the handset of the telephone instrument is off-hook (step 205). When it becomes off-hook, microprocessor 140 activates processing on a previously constructed neural network related to the user's calling behavior. The calling behavior neural network predicts the likelihood that a user will make a call to each number in the database, given the history of calling behavior encoded in the model and the current time of day and day of the week the new call is being made (step 210).

When the calling behavior neural network is activated, microprocessor 140 may also play an auditory signal to the user. Such a signal is not necessary for all implementations, however, to indicate that the system is ready for use.

The user then speaks the name associated with a desired number and microprocessor 140 tests whether the user has spoken (step 215). If so, microprocessor 140 processes the speech to extract the appropriate features and matches the results against the names in the database to find the best matches (step 220). If the spoken input does not match any name above a certain minimum threshold of similarity, test recognition fails (step 225), and microprocessor 140 awaits further spoken input (step 215).

If the spoken input matches at least one name, microprocessor 140 combines a similarity measure from the speech recognizer for each match with the resulting likelihood for the corresponding number from the calling behavior model to determine the name and number the user most likely intends to call (step 230). Microprocessor 140 then plays a name in auditory form to the user through the handset (step 235), and the user signals his or her agreement by responding verbally with either "Yes" or "No" (step 240). If the user responds with "Yes" (step 240), microprocessor 140 retrieves the number and dials it (step 245). Microprocessor 140 also saves the transaction in a training database located on hard disk 160 (step 250).

If the user responds with "No" (step 240), microprocessor 140 determines the next best overall matching name and number (step 255), and plays it to the user (step 235). If there is no adequate next best name (step 255), a recorded voice asks the user "Who do you want to call?" (step 260) and control passes to allow the user to try again to speak the desired name (step 215). The test of adequacy can be based on either a fixed number, e.g., 3, of names provided to the user, a minimum threshold for quality of the match, or a combination of both. This process continues until a user verifies a name or hangs up.

After dialing a number, microprocessor 140 periodically tests to see if the user has hung up the handset (step 265). If so, microprocessor 140 monitors the handset for an off-hook condition to initiate another call (step 205).

A "No" response to a name spoken to the user for verification (steps 235, 240) can also cause microprocessor 140 to save a record in the training database for either the integrator neural network, the call behavior model neural network, or both.

3. Software Components

Figure 3:
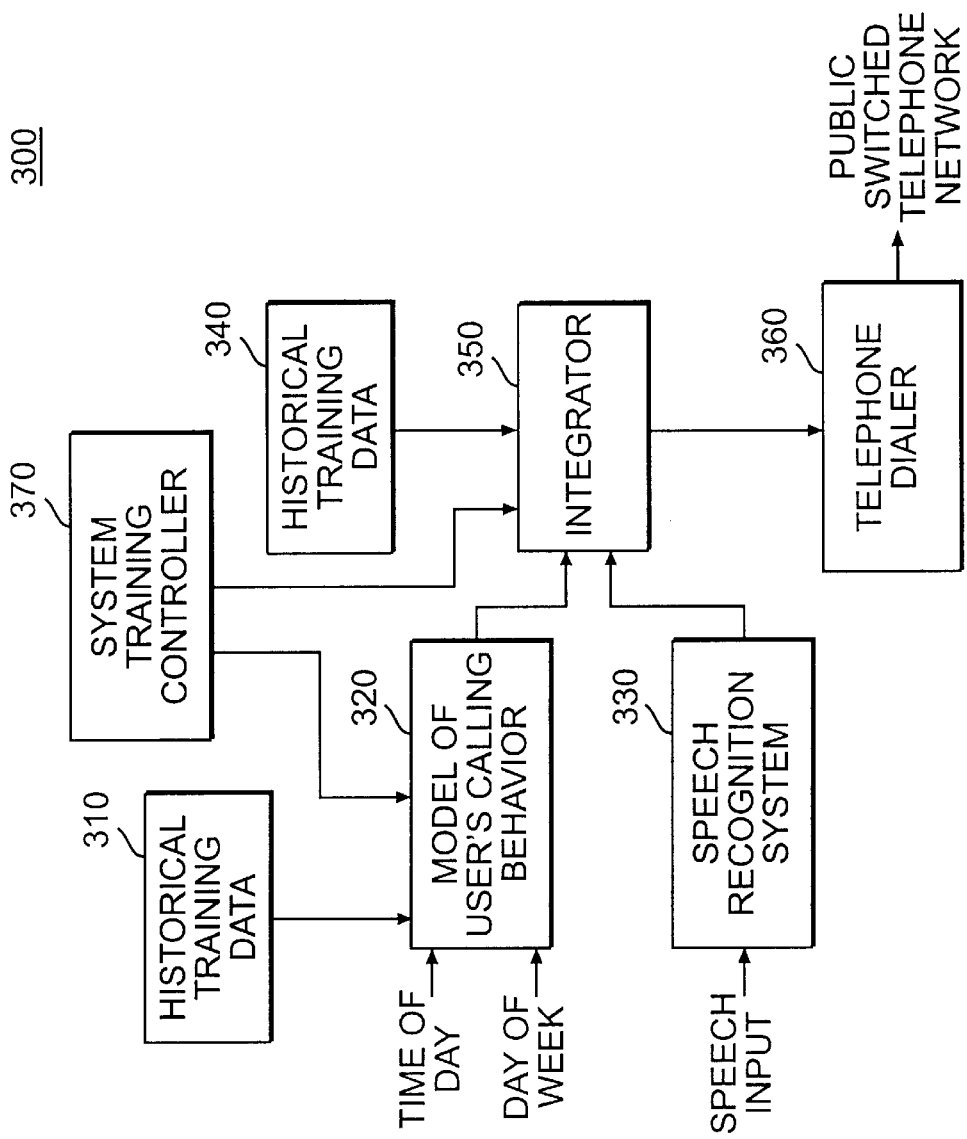
FIG. 3 is a block diagram of the software components according to the preferred embodiment of the voice-dialing system of the present invention.

FIG. 3 shows a block diagram of the software system 300 executed by microprocessor 140. The software system 300 may be stored on hard disk 160.

System 300 consists of three primary components: a model of the user's calling behavior 320, a speech recognition system 330 that performs automatic speech recognition, and an integrator 350 that integrates the outputs of the first two components to produce the best estimate of the name the user desires to call. System 300 also includes a telephone dialer 360 that looks up the actual telephone number in a table and dials it.

System training controller 370 trains the calling behavior model 320 and integrator 350, using historical training data 310 and 340, respectively. System training controller 370 is described in detail below with reference to FIGS. 9–11.

Both calling behavior model 320 and integrator component 350 preferably include a neural network. These neural networks use historical training data 310 and 340, respectively, that are maintained to continue training the neural networks when appropriate.

The use of separate neural networks for modeling calling behavior and integration reduces the complexity of the voice-dialing system and allows separate training of each network.

When a user picks up the handset of telephone 120 or dials in to the workstation 110 from a remote telephone and identifies himself or herself, microprocessor 140 reads in the weights of the user's calling behavior model 320 from hard disk 160 and determines the current time and day of the week. When the user speaks the name of the person to be called, speech recognition system 330 processes the input speech data and attempts to match it against the set of stored representations, typically sequences of phonemes, that represent each name in the database. An example of a speech recognition system with the desired capabilities include the "Model asr1500/M" speech engine from Lernout & Hauspie Speech Products N.V., Ieper, Belgium. These systems run on a personal computer with a Pentium® microprocessor in close to real time without needing an additional coprocessor.

Speech recognition system 330 produces sets of floating point numbers, each representing the extent to which there is a match between the speech input and the stored representation for the name associated with each telephone number. In practice, commercially available speech recognition engines typically produce an output consisting of a list of the "N best" matches to names in the database for which the match was above a given threshold value, with a quality measure for each. The quality measure for all other items in memory can be regarded as 0.

Integrator 350 receives the output data from both the user's calling behavior model 320 and speech recognition system and produces an output consisting of the best telephone numbers by applying the inputs to integrator 350's own neural network. This number may be dialed immediately, or a protocol followed that asks the user to verify the number as correct before dialing it (see FIG. 2). The call attempt itself is recorded in a historical training database and stored on hard disk 160 so that it can be used as historical training data to train the user's calling behavior model 320.

Integrator 350 can be implemented by conventional techniques. One such approach is simply to determine weightings that indicate the relative contribution of the calling behavior model 320 and the output of speech recognition system 330 to making the best prediction of the number the user intended to call. The output from the user's calling behavior model 320 and speech recognition system 330 for each candidate number is multiplied by the given weight and then summed, and the number with the highest numerical score then selected. This embodiment is simpler and reduces the computational requirements of the system in FIG. 3. The weighting would be arbitrarily fixed, however, and would not be adjusted specifically for each name and number and would thus be less accurate.

a. User's Calling Behavior Model Neural Network

Figure 4:
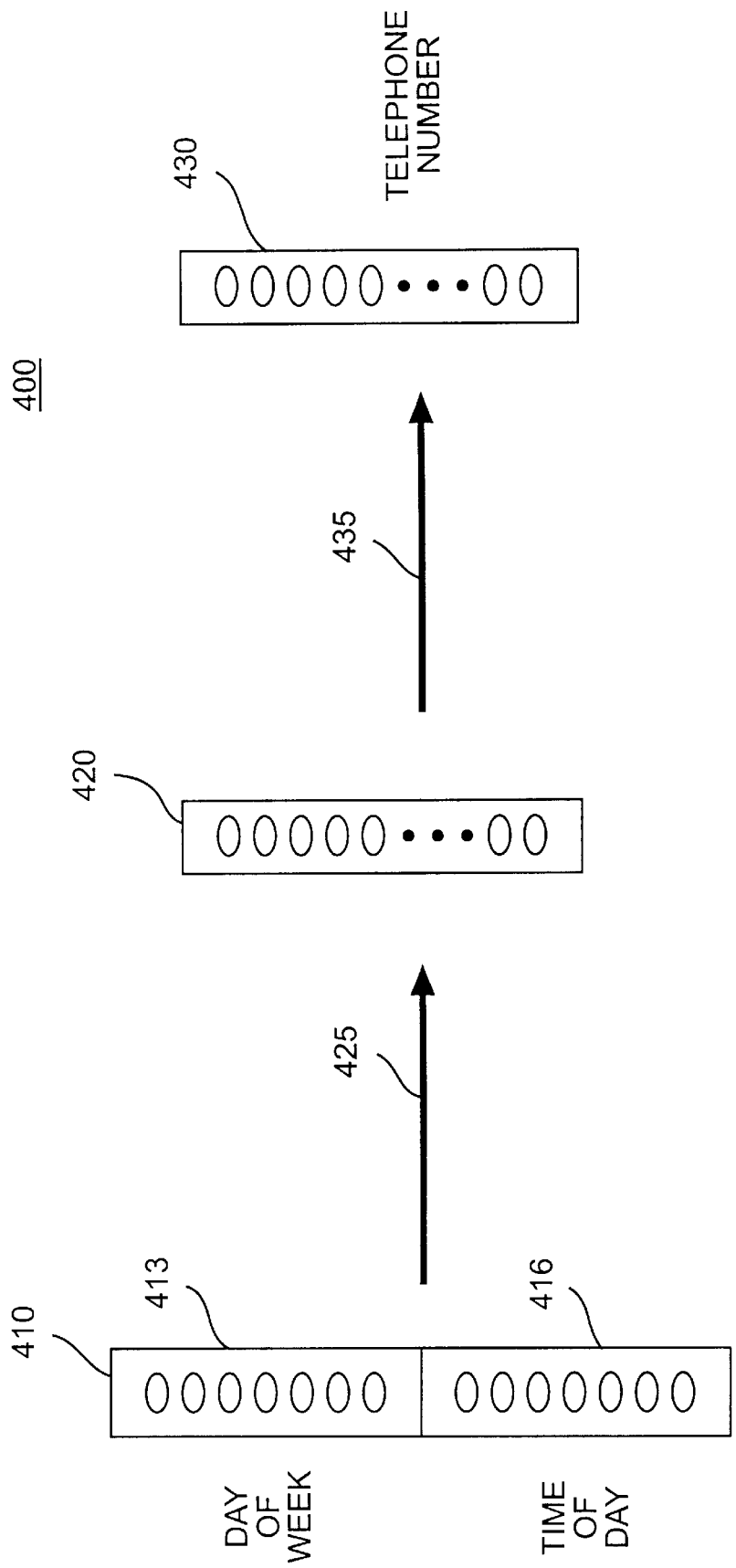
FIG. 4 is a diagram used to explain the architecture of a neural network that models the user's calling behavior for the preferred embodiment of the voice-dialing system of the present invention.

FIG. 4 shows the architecture of a neural network 400 that models the user's calling behavior for the voice-dialing system 300. Network 400 is shown as a three-layer feedforward neural network, and consists of an input layer 410, a hidden layer 420, and an output layer 430. Such a network architecture is described in detail in the paper by D. E. Rumelhart, G. E. Hinton, and R. J. Williams, "Learning internal representations by error propagation," Parallel Distributed Processing: Explorations in the Microstructure of Cognition, J. E. McClelland, D. E. Rumelhart, and the PDP Research Group, Editors, Cambridge, Mass.: MIT Press, 1986, Vol. 1, pp. 318–362. Mathematical equations that describe the computation of the activity level of a unit from its inputs and the role of the weights of connections in such computations can be found in the paper by Rumelhart, Hinton, and Williams as well as in textbooks on neural network architectures and applications.

Network 400 is implemented by software and input values are set to 0.0 for false and 1.0 for true. The software to simulate network 400 is implemented in the C++ programming language and developed in the Microsoft Visual C++® programming environment, including Microsoft Developer Studio® and Microsoft Foundation Class®, all running under the Windows 95® or Windows NT® operating systems.

A neural network consists of "units," or artificial neurons, that receive inputs through "connections" from other units that are essentially artificial resistors. Each such connection has a value known as a weight that is analogous to the resistance of a resistor. Each unit sums the input signal values received from its inputs after being weighted by the connection, and then applies a nonlinear mathematical function to determine a value known as the "activity level" for that unit. This activity level is then provided, after processing it through an output function as the output of the unit and then applied, through the resistive connections, to units in the next highest layer. For example, the outputs of layer 410 are inputs to layer 420.

Input layer 410, with its input units, is actually a dummy layer in which the activity level for each input unit is simply set to the analog value provided as input to each unit. Each input unit is connected to the input of every unit in hidden layer 420. The large arrow 425 represents such full connections.

There are approximately as many units in the hidden layer 420 as there are telephone numbers in the directory of the user. Units in layer 420 are called "hidden units" because their values are not directly observable, unlike the units of input layer 410 and output layer 430. The output of each unit in hidden layer 420 is connected to the input of every unit in output layer 430.

The output of each output unit is provided to the rest of the system as the output of neural network 400. In a feedforward network, the flow of information in network 400 is in one direction only, from input layer 410 to hidden layer 420 and from hidden layer 420 to output layer 430, as arrows 425 and 435 show.

When information is applied to the input of network 400, it propagates to hidden layer 420 and then to output layer 430. The value of each output unit, for which there is one unit corresponding to each number in the user's telephone directory, represents the likelihood that that number will be the next number called by the user.

Input layer 410 consists of two groups of inputs 413 and 416. First group 413 encodes the current day of the week and consists of 7 units, one for each day of the week. Second group 416 encodes the current time of day and consists of 7 units, each indicating a time within one of the following seven categories: midnight–6 am, 6–9 am, 9–12 am, 12–1, 1–4 pm, 4–6 pm, and 6–12 pm.

Calling behavior component 320 first determines the current day and time by means of the appropriate systems call, such as GetLocalTime, a calling program in C++, and then codes this information by selecting the appropriate inputs.

The day of the week and time of day inputs are not the most significant effects on calling behavior network 400 that result in an output. In most cases, network 400's most significant predictive capability comes from biasing toward or against specific numbers. Biasing results from training network 400 from the historical data that is relatively independent of day and time. Day and time inputs become significant primarily when very strong patterns occur involving these parameters, such as making many calls to a particular number on the same day and time. Whether inputs exist is not even critical to the operation of the network. User model 400 could reliably predict the likelihood of calls to particular numbers based on the historical training data alone without any inputs to the network. This is because network 400 bases its predictions on a user's calling behavior determined by the frequency of incoming and outgoing calls.

Alternatively, neural network 400 may include two layers of hidden units. The additional hidden layer requires an additional set of connections and weights. Each of the two layers has approximately the same number of hidden units, which approximates the number of telephone numbers in the user's personal directory. The advantages of the additional layer are to allow the capture of more subtle interactions among specific numbers, times, and days, than is possible with a single hidden layer. The disadvantages includes additional processing capacity and memory required to implement the network, longer training times, and possibly less stable training.

The two possible methods for training the neural network 400 are complete and incremental. Complete training is preferred, but it takes place only once per day. If network 400 is not immediately updated for calls made or received during each day, there may be a drop off in accuracy due to a risk of possible data loss. To accomodate for this potential data loss, calls received and made on a particular day may be kept in RAM 150, with the predicted probability for the telephone number of such a call calculated by a simple procedural algorithm. Calculation of the likelihood of a telephone number corresponding to a call in RAM 150 may be done by simply setting the likelihood to 0.9, and ignoring the prediction made by the network 400. Otherwise, the prediction made by the network 400 would be used.

Incremental training is done after each call whenever it appears that the computer is not being heavily used and computational capacity is available, and consists of that additional training necessary to update network 400 to the just completed call or calls.

b. Integrator Neural Network

Figure 5:
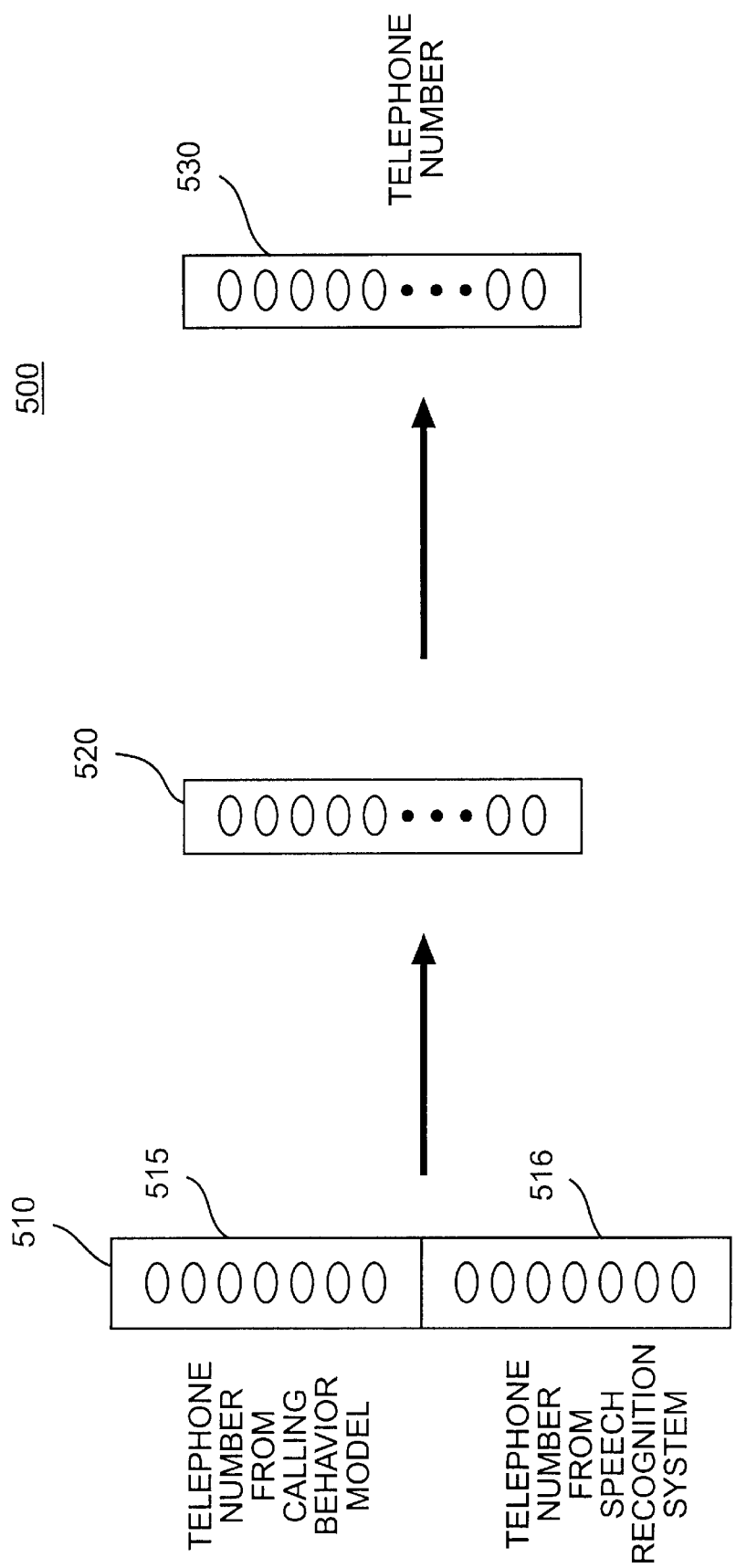
FIG. 5 is a diagram used to explain the architecture of an integrator neural network for the preferred embodiment of the voice-dialing system of the present invention.

FIG. 5 illustrates the architecture of integrator 350's neural network 500. The network 500 consists of a multilayer feedforward network with an input layer 510, a hidden layer 520, and an output layer 530. Input layer 510 consists of two groups 515 and 516. First group 515 consists of an input unit for each telephone number defined in the user's directory, with the input connected to the corresponding output for that telephone number from neural network 400. Second group 516 also consists of an input unit for each defined telephone number, with the input connected to the corresponding output for that telephone number from the speech recognition system. The input telephone numbers for which there is an "N best" recognition output for the corresponding name from the speech recognition system have the appropriately scaled (0.0 to 1.0 range) similarity measure fed into the corresponding input units. Telephone numbers for which there is no recognition output for the corresponding name have the corresponding input unit set to 0.0. Network 500 also has hidden layer 520, with the number of units approximating the number of telephone numbers in the directory of the user, and output layer 530, which has one unit for each telephone number in the database.

Network 500 can be implemented by software. Once input data is provided to the speech input units, the simulator computes the activity levels for each hidden unit based on all input units, including day and time, and then the activity levels for each output unit. When the information has completed propagating through network 500 in this way, system 300 selects the output unit with the highest activity level as the most likely number desired by the user. System 300 then initiates the verification procedure (see FIG. 2), and, if successful, invokes dialer 360 to dial the number.

Network 500 thus does more than adjust the relative contribution of speech recognition system 330 and model 320 in making each decision. It makes the adjustments differentially for each number. This is desirable because name and number combinations differ in the extent to which it helps for predictive model 320 to override the decision of recognizer 330. When the user systematically and repeatedly mispronounces a person's name or where the user correctly pronounces a person's name but system 300 has matched the incoming speech to an orthographic model because of improper pronunciation, system 300 will learn that predictive model 320 needs to be given more weight to adjust the model for these matching errors.

Integrator 350's neural network 500 is trained by the backward propagation learning algorithm, as is the case for the neural network 400 of the user's calling behavior model 320 described previously. Networks 400 and 500 are trained separately, but network 500 uses a training set consisting of a set of telephone numbers and match quality pairs for input and a single telephone number for output. When training neural network 500, the input units with a connection from calling behavior model 400 for any of the telephone numbers having outputs from speech recognition system 330 are set to a fixed value, such as 0.8. This value corresponds to the maximum expected output from the calling behavior model network assuming a very likely call. All other units with inputs from calling behavior model 320 are set to 0.

When a name and telephone number is in the user's personal directory, but the user has never successfully dialed it by voice, there is no speech matching quality data available. In such cases a "dummy" training example is created that has a single telephone number and a speech match quality set to a fixed moderate value (e.g., 0.50), with the speech match quality set to 0 for all other numbers.

c. Call Processing for Training Neural Nets

Figure 6A:
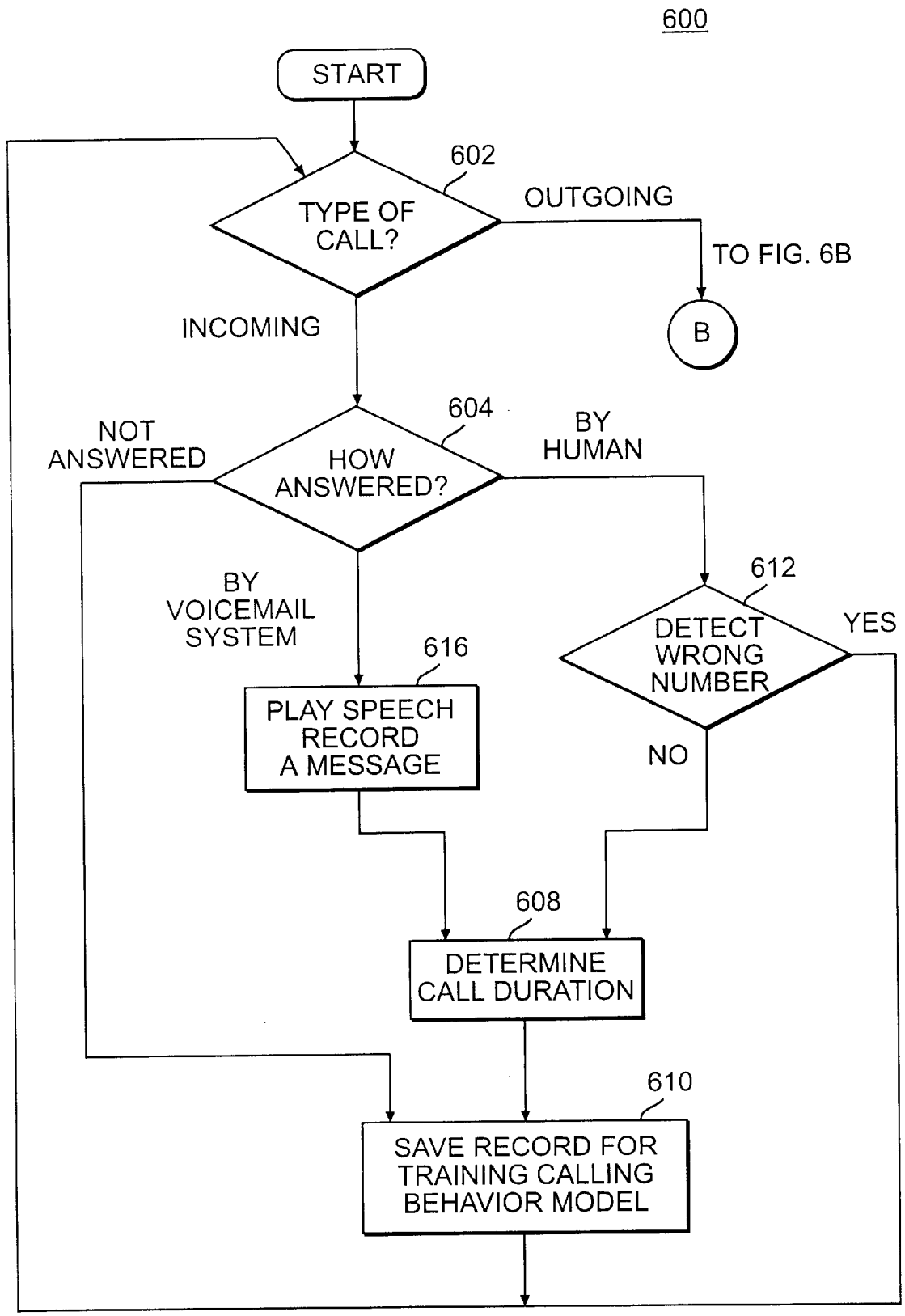
FIGS. 6a and 6b show a functional flowchart of steps used by the voice-dialing system in FIG. 3, during incoming and outgoing telephone calls, to record information for training the neural networks shown in FIGS. 4 and 5.
Figure 6B:
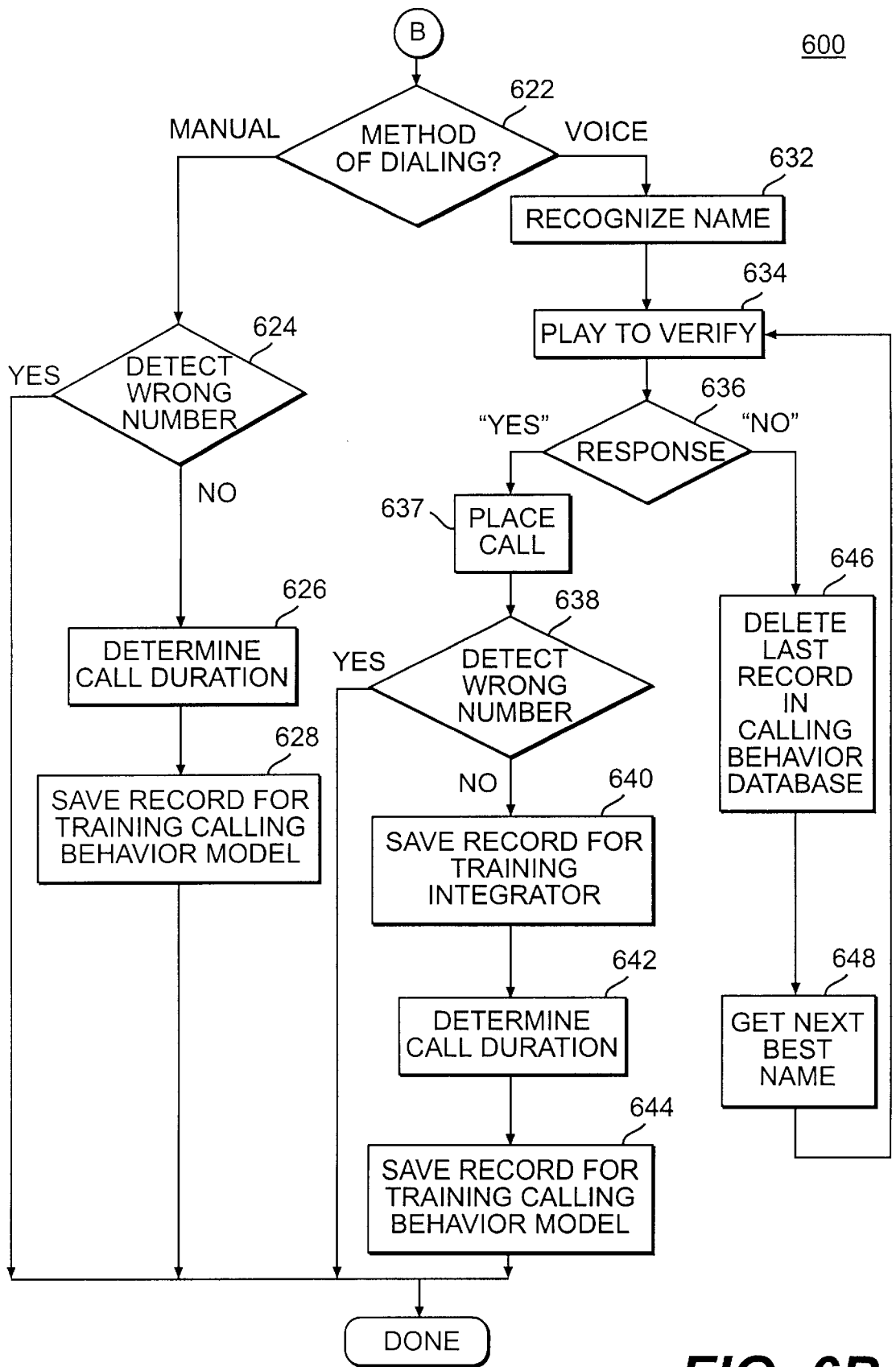

FIGS. 6a and 6b show a flowchart of the procedure 600 used by the system 300 during incoming and outgoing telephone calls for recording information for training the neural networks 400 and 500. Once initiated, system 300 tests the type of call, whether incoming or outgoing (step 602). If the call is an incoming call, system 300 deteremines whether the call is not answered, answered by a voicemail system, or answered by a human (step 604). If the call was not answered the number of the calling party can be stored if the telephone has a caller ID system. If the call was not answered but caller ID data is available, system 300 saves a record in the historical training database for training the calling behavior model (step 610), in this case the fact of the call being received (duration of call=0).

If the call was answered by a voicemail system (step 604), system 300 plays speech from a recorded answering message (step 616), and attempts to record a message. System 300 starts a timer and, when the message is complete, it determines the duration of the call (step 608), and saves a record in the historical database for the calling behavior neural network 400 (step 610). Control then passes to the beginning to wait for another call (step 602).

If the call was answered by a human (step 604), control passes to monitor the speech and attempt to recognize such phrases as "wrong number", "sorry, wrong", etc., indicating that the call is in error (step 612). Because of the tendency of speech recognition system 330 operating in this "word-spotting" mode to generate false alarms, the threshold for recognition of one of these phrases is set high, and the phrase must also occur within a certain elapsed time (e.g., 20 seconds) after the beginning of the call.

In an alternative embodiment, the syntax of common dialogue interactions, such as "Can I speak to Debbie Heystek? No, there is no one here by that name" are encoded in the grammar of a speech recognition system. The system can also perform syntactic processing and, by assessing the likelihood of different interactions likely to indicate a wrong number, can detect a "wrong number" situation with increased accuracy.

If a wrong number is detected (step 612), control passes to the beginning of procedure 600 to wait for another call (step 602). If there is no wrong number detected, the duration of the call is determined (step 608), and a record is saved in the historical database for the calling behavior model (step 610).

If the call is an outgoing call (step 602), the system determines whether the number was dialed manually or by voice (step 622 in FIG. 6b). If the call is dialed manually (step 622), it is completed normally and system 300 determines the possibility of a "wrong number" in the manner discussed above (step 624). If the number is wrong (step 624), control passes to the beginning of procedure 600 (step 602 in FIG. 6a).

If system 300 does not detect a wrong number (step 624), it measures the duration of the call (step 626). When the call has been completed, system 300 stores a record of the call in the historical database for training the calling behavior neural network 400 (step 628). Control passes to the beginning of procedure 600 to wait for another call (step 602 in FIG. 6a).

If the call is dialed by voice, speech recognition system 330 attempts to recognize the name (step 632). If successful, system 330 plays the name back to the user to verify (step 634). If the user's response to an attempt to verify is "Yes"

(step 636), the call is placed (step 637), and monitored for "wrong number" indication (step 638). If so, control passes to the beginning of procedure 600 (step 602 in FIG. 6a).

If the number is not wrong, system 300 saves a record in the historical database to train the integrator neural network 500 (step 640).

When the call completes, the duration of the call is determined (step 642), and a record of the call is stored in the historical database for training the calling behavior neural network 400 (step 644). Control passes to the beginning of procedure 600 to wait for the next call (step 602 in FIG. 6a).

If the user's response to the verification is negative (step 636), the most recently entered record is deleted from the calling behavior model training database (step 646). The system then obtains the name with the next closest match (step 648), and verification continues (step 634).

Alternative procedures are also possible. For example, deleting the record (step 646) is not always necessary. Also, the user can respond with "Disconnect" instead of "Yes" or "No," with "Disconnect" causing the deletion of all historical records for the calling behavior network for the particular name and number. This response can be selected by the user when a particular number frequently overrides a desired number or numbers.

There is typically a limit to the number of records in the historical database for the neural network 400. To allow the historical database to keep storing records, old records must be purged. In the preferred embodiment, when at least five records exist for the same telephone number, the oldest of the records for that number is deleted. If not, the oldest record for the telephone number with the most records in deleted.

d. Calling Behavior Training Data Structure

FIG. 7 shows a data structure 700 of historical call information saved for use in training calling behavior neural network 400. The columns 710, 720, 730, 740, 750, 760, and 770 show data recorded for each call as a result of an incoming or outgoing call. A record 780 includes for each call:

1) a date of the call 710;
2) a day of the week 720 (0–6 records Monday through Sunday, respectively);
3) a time of day 730 (0 if midnight–6 am, 1 if 6–9 am, 2 if 9–12 am, 3 if 12–1, 4 if 1–4 pm, 5 if 4–6 pm, and 6 if 6–12 pm.);
4) a telephone number 740;
5) an indication 750 of whether the call was incoming or outgoing (0 if incoming, 1 if outgoing);
6) an indication 760 how the call was answered, if an incoming call 0 indicates not answered, 1 indicates answered by a voicemail system, and 2 indicates answered by a human; and
7) call duration 770.

Preferably, the duration of an answered call is measured in seconds. The duration of an unanswered call is measured by the number of rings. For an incoming call answered by a voicemail system or answering machine, the duration is the time elapsed from the end of the message played to the caller to the end of the message left by the caller. For all other calls the duration is measured from the beginning of the connection to its end.

e. Integrator Training Data Structure

FIG. 8 shows a data structure 800 of historical call information saved for use in training integrator neural network 500. Pairs of columns 820 and 825, 830 and 835, and 840 and 845, show three sets of numbers to be called and the corresponding quality of the match (similarity measure) between the incoming speech signal and the phonetic representation in the speech database managed by the speech recognition system 330. Column 850 shows the correct number that the user indicated in the verification procedure was correct by responding with "Yes." FIG. 8 shows only three pairs for clarity. An actual system would have 5–10 pairs saved per correct call.

f. Training Routine

Figure 9:
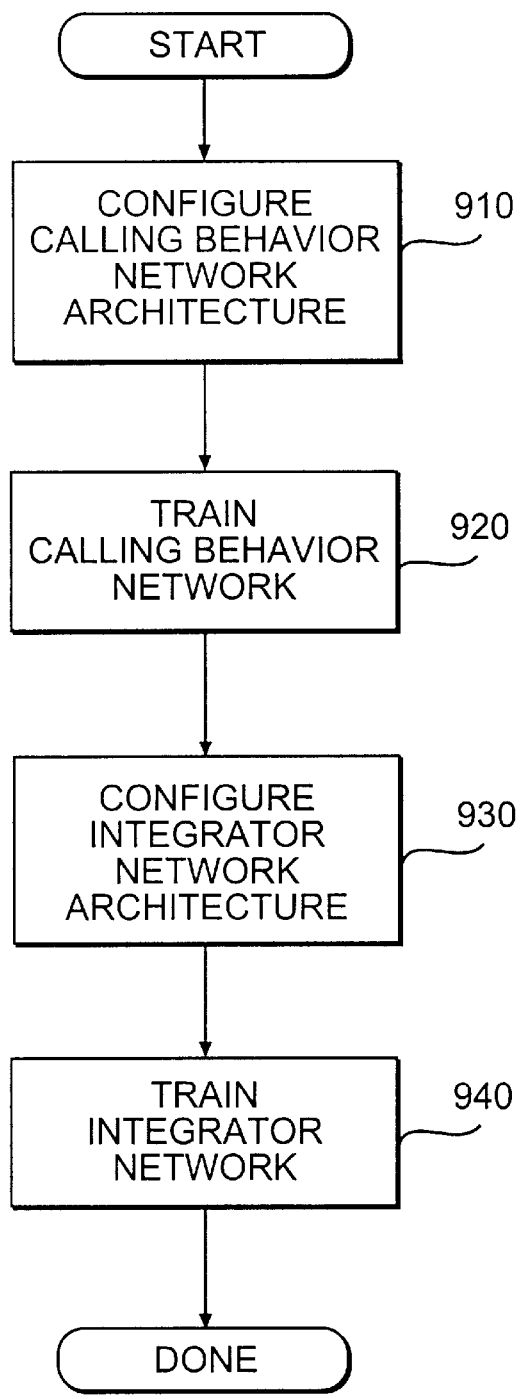
FIG. 9 is a flowchart of events that occur when the preferred embodiment of the voice-dialing system of the present invention trains the neural networks shown in FIGS. 4 and 5.

FIG. 9 shows a flowchart of a procedure 900 used by voice-dialing system 300 to train neural networks 400 and 500. The procedure 900 is part of a system training controller 370 and is implemented in software.

When voice-dialing system 300 is installed on workstation 110, the user sets a parameter in system training controller 370 to indicate a daily time (e.g., 2 a.m.) that system training controller 370 uses for training both neural networks 400 and 500. This time should be chosen to avoid periods when the computer is in use. When the appropriate time is reached, controller 370 tests to ensure that workstation 110 is not in use and is available for network training. If workstation 110 is in use, controller 370 waits until the recent history of microprocessor 140 usage is such that it is clear that adequate computation time is available without interfering with user activity.

When workstation 110 is available and training is initiated, controller 370 configures the network architecture for the calling behavior network (step 910). This is done by determining the number of names and associated telephone numbers in the current directory, and constructing a network with the appropriate number of hidden units, output units, and connections between the input layer and hidden layer and between the hidden layer and output layer. The exact number of hidden units can be adjusted to yield the best generalization performance. Rules based on these adjustments are encoded in the architecture configuration and learning part of the eventual product. The number of hidden units must be substantially less than the number of combinations of telephone numbers crossed with the alternative times, etc., so as to force the network to generalize.

Next, controller 370 trains the calling behavior network (step 920) and configures the integrator network architecture 500 based on the number of names and associated numbers in the directory (step 930). Finally, the controller 370 trains the integrator network (step 940).

i. Training—Calling Behavior Network

Figure 10:
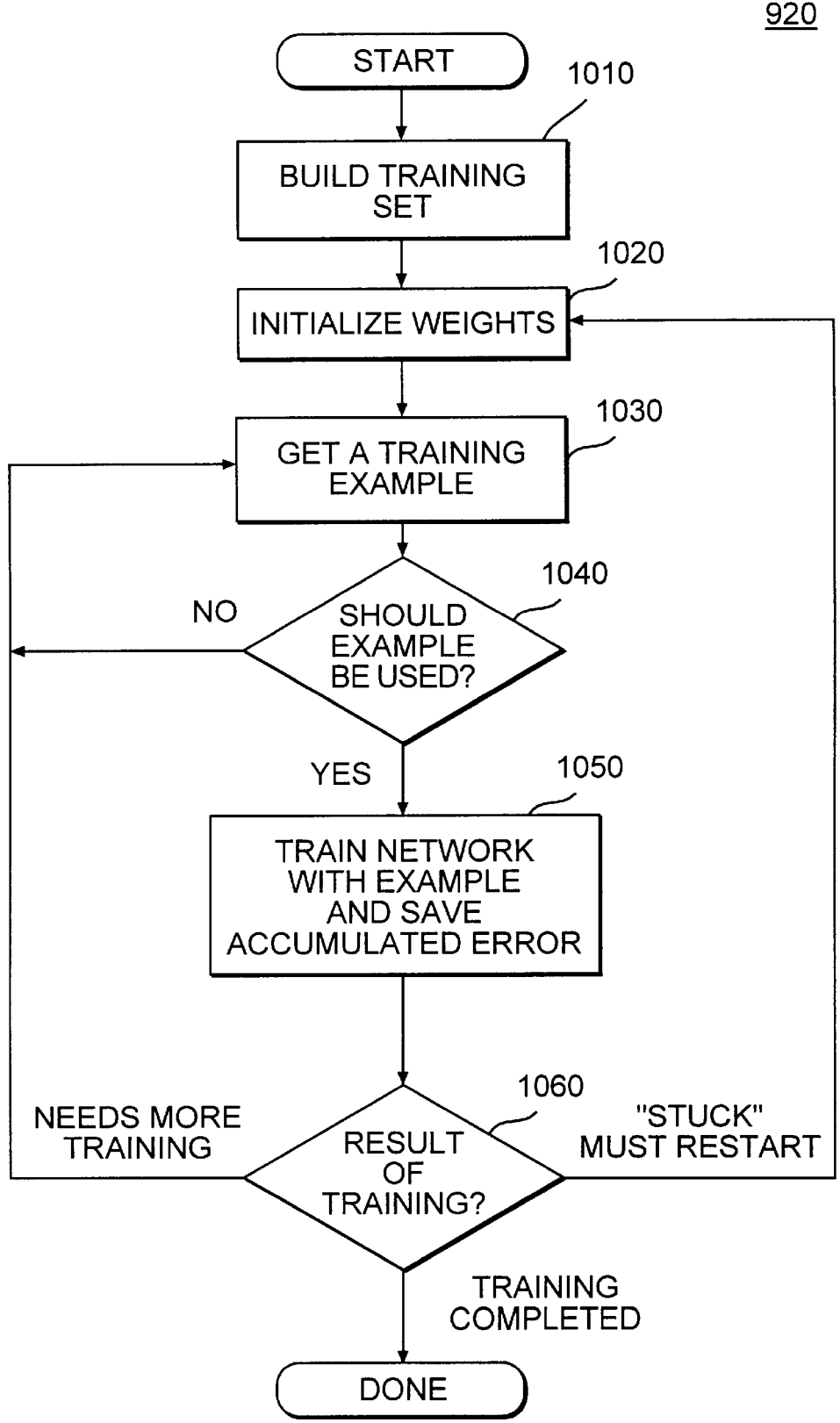
FIG. 10 is a flowchart of the steps used when the preferred embodiment of the voice-dialing system of the present invention trains the calling behavior neural network.

FIG. 10 shows a flowchart describing the steps for training calling behavior network 400 (see step 920 of FIG. 9). When initiated, controller 370 first builds a training set from historical training data shown in FIG. 7 (step 1010). This historical training data is stored in a database file on hard disk 160 (FIG. 1). Each record in the historical database is converted to an example for training. In addition, each number in the personal directory is searched for in the historical database. If a record is not found, a training example is created for that number with a minimum selection probability.

The following fields are preferably defined in the set of training examples: day, time, telephone number, selection probability, and the number of records for the given telephone number. The day and time are provided to the network input layer when training, and the telephone number is provided at the output layer of the network 400 for use by the learning algorithm. The selection probability is a parameter that defines the probability that the example will, at any given cycle through the training procedure, be selected as a training example. It has a value between 0.002 to 1.00. The number of records, and thus examples for the given telephone number is needed to determine the extent to which the inputs are set to random values, rather than the actual day of the week and time of day. This is necessary when relatively few records exist for a given telephone number, preventing the network from generalizing sufficiently to output the given telephone number if the input values are different from those for the existing records.

For example, if a single record exists of a call to a number at 12 noon on Tuesday, the network, if trained with only this data, would have a substantial output value for the given telephone number only if the input specified noon on Tuesday. If 50 records existed for the same number at diverse times and days, a reasonable output value would be likely for that number with inputs at nearly any time and day. If 50 records existed for the same number, all at noon on Tuesday, the network would again be responsive for the given number only at that time and day, but quite legitimately so, given the history of calls.

The selection probability is computed as follows:

$$P_{selection} = X_{age} * X_{duration},$$

where $X_{age}$ ranges from 0.01 to 1.0 and $X_{duration}$ ranges from 0.20 to 1.00. $P_{selection}$ thus has possible values from 0.002 to 1.00.

$X_{age}$ the number of days between the call being made and the network being trained. The values are assigned as follows: 0.01 if the call was made over a year ago, 0.02 if the call was made 181–365 days ago, 0.04 if the call was made 91–180 days ago, 0.08 if the call was made 31–90 days ago, 0.15 if the call was made 10–30 days ago, 0.30 if the call was made 4–9 days ago, 0.60 if the call was made 2–3 days ago, and 1.0 if the call was made yesterday.

The value of $X_{duration}$ depends on both the circumstances of the call and the actual duration. For outgoing calls or incoming calls answered by a human, $X_{duration}$ is assigned as follows: 1.0 if duration>60 minutes; 0.8 if 11–60 minutes, 0.6 if 2–10 minutes, 0.4 if 30–119 seconds, and 0.20 if 15–30 seconds. If the call duration is less than 15 seconds, the record is discarded as unreliable.

For unanswered incoming calls, the call must ring at least twice or the record is discarded as unreliable. For unanswered incoming calls that are not answered that ring at least twice, when such a call is detected and the age of the call is three days or less, a search of following records is made to determine whether a later record exists of an outgoing call to the same number indicating that the call has been returned. For unanswered unreturned incoming calls with two or more rings that is three days old or less, in which the user has access to caller ID records that show who has called, $X_{duration}$ is as follows: 0.4 if 2–4 rings, 0.8 if 5–7 rings, and 1.0 if 8 or more rings. For unanswered incoming calls not meeting these conditions, $X_{duration}$ is as follows: 0.2 if 2–4 rings, 0.4 if 5–7 rings, and 0.6 if 8 or more rings.

For incoming calls that are answered by a voicemail system with a message left, the message must be at least five seconds long or the record is discarded as unreliable. For such calls a search of records is done to determine whether the call has been returned, assuming that the message is five seconds or more in duration, and is no more than three days old. For unreturned calls meeting the criteria, $X_{duration}$ is as follows: 0.4 if the message is 5–15 seconds in duration, 0.8 if 16–60 seconds in duration, and 1.0 if 61 seconds or more in duration. For other calls, $X_{duration}$ is as follows: 0.2 if the message is 5–15 seconds in duration, 0.4 if 16–60 seconds, and 0.6 if 61 seconds or more.

After the training set has been constructed (step 1010), the set of weights for the connections between units of the network is then set to random values to initialize the network 400 (step 1020). A training example is then obtained from the training set (step 1030). This training example is the first in the set if the weights have just been initialized. Otherwise, the next example in the set is selected. If there are no more examples in the set (as the result of the previous training example being the last in the set), the first example in the set is selected.

A calculation is then made to determine whether the example just selected is actually used to train the network on the current pass (step 1040). The selection probability for the example is retrieved, and a random number from 0 to 1.0 is generated and compared with the selection probability. Only if the number is less than or equal to the selection probability is the example used.

For example, if the selection probability is 0.5, then the example is only used when the random number generated is from 0 to 0.5, or 50% of the time. If the selection probability is 0.1, then the example is only used when the random number is from 0 to 0.1, or 10% of the time. If the example is not used, control is passed to obtain another training example (step 1030).

Otherwise, the network 400 is trained with the example and the accumulated error saved (step 1050). This is done by first providing the input of the network 400 with the appropriate input signals. These can be either the actual inputs for the example or, as suggested above, randomized inputs.

When training begins, a parameter known as the input randomization probability cutoff, $P_{cutoff}$, is calculated according to the following formula:

$$P_{cutoff} = N_{records}/N_{combination},$$

where $N_{records}$ is the number of records for this number in the historical database, and $N_{combinations}$ is the number of input combinations, which equals the number of levels of the day of week multiplied by the number of levels of the time of day input. For the network shown, $N_{combinations}=7\times7=49$.

A random number from 0 to 1 is generated for each example and compared with the input randomization probability cutoff, $P_{cutoff}$. If the number is less than $P_{cutoff}$, a random number from 1 to 7 is generated to input to the time of day units, and a separate random number from 1 to 7 is generated to input to the day of week units. If the random number is equal to or greater than $P_{cutoff}$, the actual inputs from the example are fed to the input units of the network.

Thus, for example, if only 1 record was available, $P_{cutoff}$ is 1/49, or about 0.02, and the network 400 would be trained with a random date and time for 98% of the training trials (on average). For 49 available records, $P_{cutoff}$ is 49/49=1.0, and the network 400 would be trained with the actual date and time essentially all of the time.

Training is done by applying the example to the appropriate inputs and outputs of the network 400, then using the backward propagation learning algorithm to modify the values of the weights of the connections in the network 400. Details of the backward propagation algorithm are described in the Rumelhart, Hinton, and Williams paper, which was referred to above. In this training, a set of data is used that includes both input and output data.

Thus, for example, a particular piece of data might consist of the day of the week and the time of day for inputs and a telephone number as output. The input data to the input layer are entered by setting the input unit matching the output from the example to 1.0, or "true," and setting all other input units to 0.0, or "false." Thus, in the case of the day of the week "Tuesday", the input unit corresponding to "Tuesday" is set to 1.0, while the other 6 input units are set to 0.0.

The telephone number for each trial is then effectively applied to the output units using the following steps. First, information is applied to the inputs of the network and then allowed to propagate through the network to the output units. Next, a calculation is made of the "error" of the network for each output unit by subtracting the actual output (activity level) of each unit from either 1.0, if the unit corresponds to the telephone number associated with the given trial, or 0.0. This error value is then "propagated backward" through the earlier layers of the network 400, by systematically changing the values of the weights according to the backward propagation learning algorithm in such a manner as to reduce the error. A given set of data is applied repeatedly to a network 400 until overall error is reduced to the point that the network 400 is considered trained.

The "accumulated error" is determined by summing the error for all output units across all training examples. The error for each unit is equal to the desired output value minus the actual output value. After training the network 400 with an example, a test is made of the result of the training thus far (step 1060). The backward propagation learning algorithm is a "hill-climbing" algorithm. It uses a computation based on local information to seek a global minimum of error.

Such an algorithm can become "stuck," however. Networks may oscillate, continuing to learn for a short period but then falling back. The accumulated error after training is tested against a threshold level below which the network 400 is considered fully trained. If the error is above the threshold and the number of training trials is below a maximum, the network 400 needs more training. If the error is above the threshold and the maximum allowed number of training trials have been reached, the network 400 is considered "stuck." In general, the complexity of the problem is low and it is unlikely that the network 400 will become stuck. Because certain sets of random weight values can cause a network to become stuck even with problems of low complexity, it is necessary to test for this condition and respond to it.

If network 400 needs more training (step 1060), control returns to obtain another training example (step 1030). If the network 400 is "stuck," control passes to initialize the weights and begin the training process from the beginning (step 1020). If the network 400 has its accumulated error below the threshold, then the training is completed.

ii. Training—Integrator Network

Figure 11:
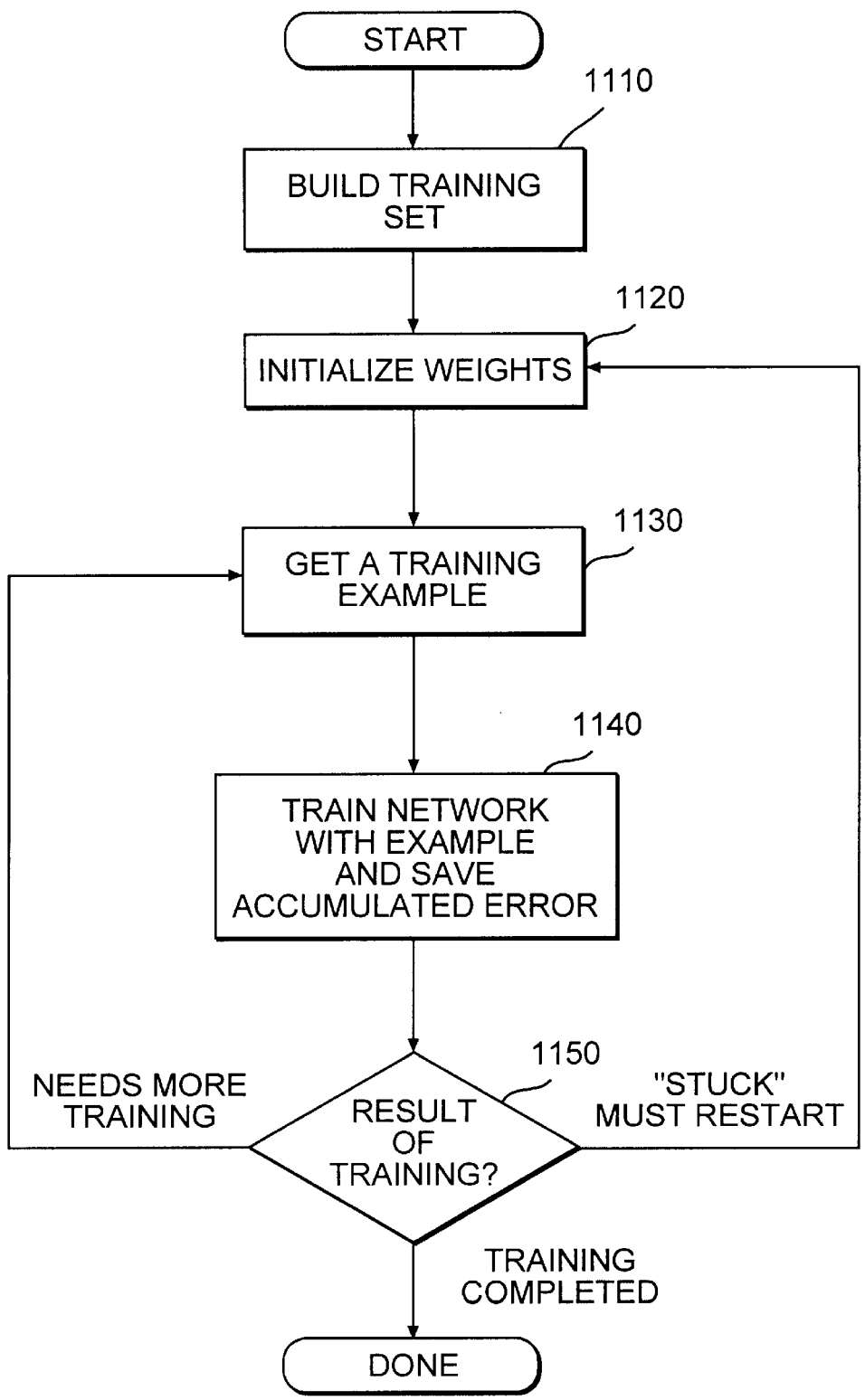
FIG. 11 is a flowchart of the steps used when the preferred embodiment of the voice-dialing system of the present invention trains the integrator neural network.

FIG. 11 is a flowchart describing the procedure for training the integrator network (see step 940 in FIG. 9). When initiated, the training controller 370 first builds a training set from the historical training data (step 1110). Each record in the historical database is used as an example for training, with the data read into temporary RAM 150 to allow rapid training. In addition, a list of all of the telephone numbers referred to in the historical database is created, and its contents matched against all numbers in the personal directory to determine those numbers entered into the directory for which there is no historical database record. A training example for each of these numbers is also created in RAM 150, with the match quality set to 0.8 for the number in question and 0 for other numbers.

The set of weights for the connections between units of network 500 is then set to random values to initialize network 500 (step 1120). A training example is then obtained from the training set (step 1130). This training example is the first in the set if the weights have just been initialized. Otherwise, the next example in the set is selected. If there are no more examples in the set (as a result of the previous training example being the last in the set), the first example in the set is selected.

Network 500 is then trained with the example and the accumulated error saved (step 1140). This is done by first providing those input units of the network for which there exists a speech match quality score. The input values to all other input units is set to 0.

Training is done by applying the example to the appropriate inputs and outputs of network 500, then using the backward propagation learning algorithm to modify the values of the weights of the connections in the network.

The "accumulated error" is determined by summing the error for all output units across all training examples. Error for each unit is equal to the desired output value minus the actual output value.

After training network 500 with an example, a test is made of the result of the training by comparing the accumulated error after training against a threshold level below which network 500 is considered fully trained (step 1150). If the error is above the threshold and the number of training trials is below a maximum, network 500 needs more training. If the error is above the threshold and the maximum allowed number of training trials have been reached, network 500 is considered "stuck."

If network 500 needs more training (step 1150), control is passed to obtain another training example (step 1130). If network 500 is "stuck," control is passed to re-initialize the weights and begin the training process from the beginning (step 1120). If network 500 has its accumulated error below the threshold, then the training is completed.

g. Procedure for Modifying Personal Directory

Figure 12:
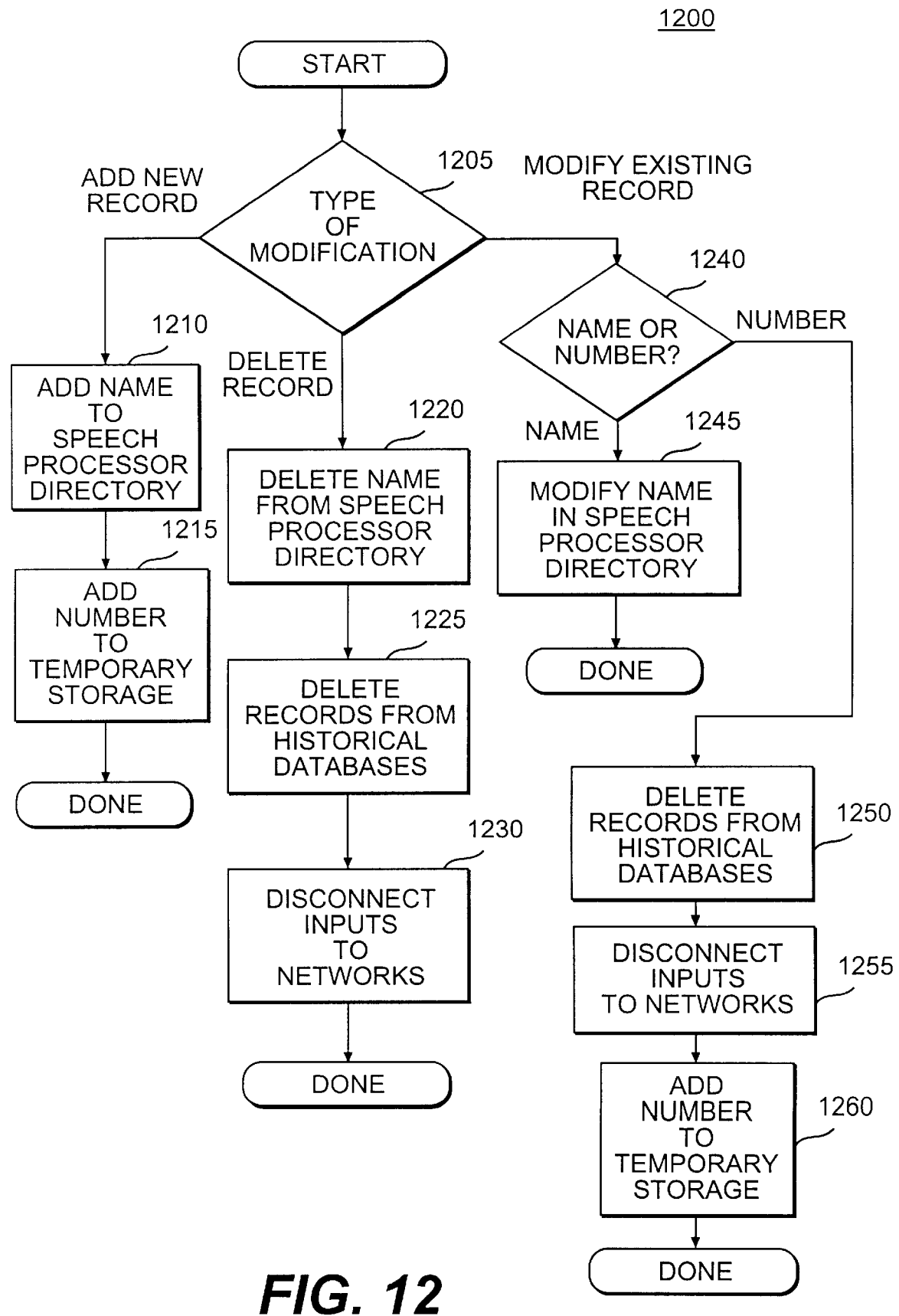
FIG. 12 is a flowchart showing the procedure followed by the preferred embodiment of the voice-dialing system of the present invention when the user modifies the directory of names and associated telephone numbers.

FIG. 12 shows a flowchart of the prefered procedure 1200 to control the process used when the user modifies the directory of names and associated telephone numbers. The voice-dialing system 300 includes a component having software corresponding to procedure 1200. Microprocessor 140 executes procedure 1200 to modify the personal directory.

First, the type of modification is determined (step 1205). The user can add a new record, delete an existing record, or modify an existing record. If the modification requires adding a new record, the name and associated telephone number are entered by the user using keyboard 190 and a graphical interface on display 180, and mouse 195. The name is then added to the list of names contained in the speech recognition system 330 (step 1210). The name, and appropriate codes for connecting the name and telephone number with the software that provides an interface with neural networks 400 and 500, are then added to a temporary store for use until the networks 400 and 500 are trained to make use of the new name directly (step 1215). The procedure is then finished.

If the modification involves deleting a record (step 1205), the name is removed from the list of names contained in the speech recognition system 330 (step 1220). System 300 then searches the databases containing historical data for training calling behavior network 400 and integrator network 500, and deletes all records that refer to the number being deleted (step 1225). The connections to the inputs of networks 400 and 500 that refer to that number are then disconnected (step 1230), so that there will be no activity in networks 400 and 500 for that number. The procedure is then finished.

If the modification involves modifying an existing record (step 1205), a test is made of whether the modification is to a name or a number (step 1240). If the modification is to a name, the name in the speech recognition system 330 is modified as appropriate (step 1245). The procedure is then finished.

If the modification is to a number, system 300 then searches the databases containing historical data for training both calling behavior network 400 and integrator network 500, and deletes all records that refer to the old number being deleted (step 1250). The connections to the inputs of networks 400 and 500 that refer to that old number are then disconnected (step 1255), so that there will be no activity in the networks 400 and 500 for that number. The new number is added to a temporary store for use until networks 400 and 500 are trained to make use of the new number directly (step 1260). The procedure is then finished.

B. PBX System

1. System Architecture

Figure 13:
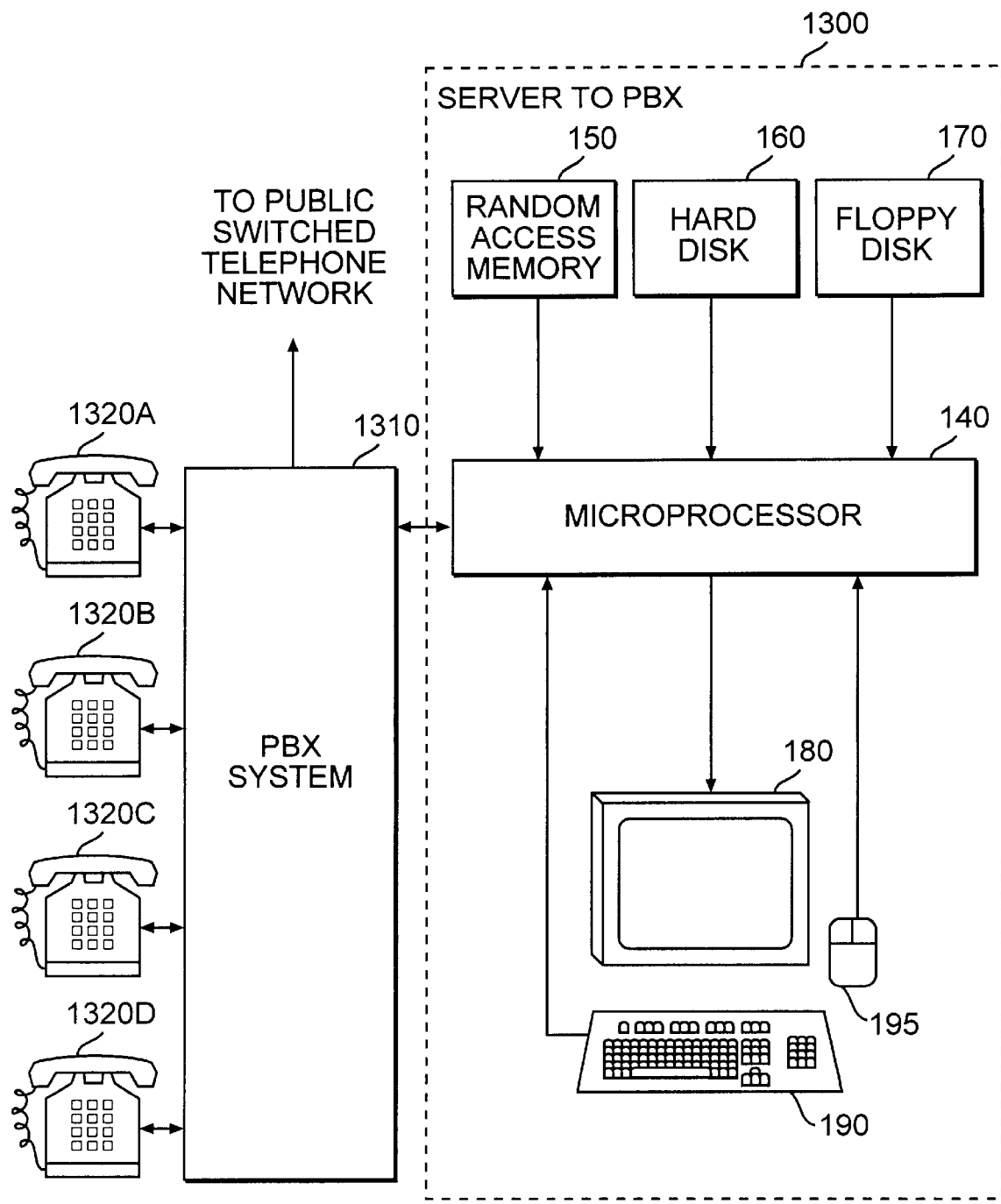
FIG. 13 is a block diagram of another embodiment of the voice-dialing system according to the present invention.

FIG. 13 shows an alternate embodiment in which the voice-dialing system according to the present invention is implemented as a server 1300 for a PBX system 1310 to provide voice-dialing service for all of the telephone users at a particular site. Server 1300 is connected via a high-speed digital connection to PBX system 1310 that contains a number of telephone lines connected to telephones 1320*a*–*d*. A typical PBX would have tens to hundreds of these lines. PBX system 1310 may be a Northern Telecom Meridian 1 PBX system, with a T1 digital connection between server 1300 and PBX system 1310. Server 1300 consists primarily of the same hardware components 140–195 illustrated in FIG. 1.

In operation, server 1300 maintains, in the form of stored weights on hard disk 160, a separate neural network architecture and memory of calling behavior history for each user (telephones 1320*a*–*d*). Video display 180, keyboard 190, and mouse 195 are for maintenance of server 1300 and could be dispensed with, particularly if server 1300 was connected to a local area network such that maintenance of server 1300 could be done using a remote workstation over the local area network. PBX system 1310 is also connected to the public switched telephone network.

Floppy disk 170 is for loading software and could be dispensed with if software were loaded over a local area network.

When a user picks up a handset of one of telephones 1320*a*–*d*, weights of the calling behavior neural network for that telephone are read into RAM 150. The calling behavior neural network for that telephone is then executed for the given time and date as described above.

2. Software Components

Figure 14:
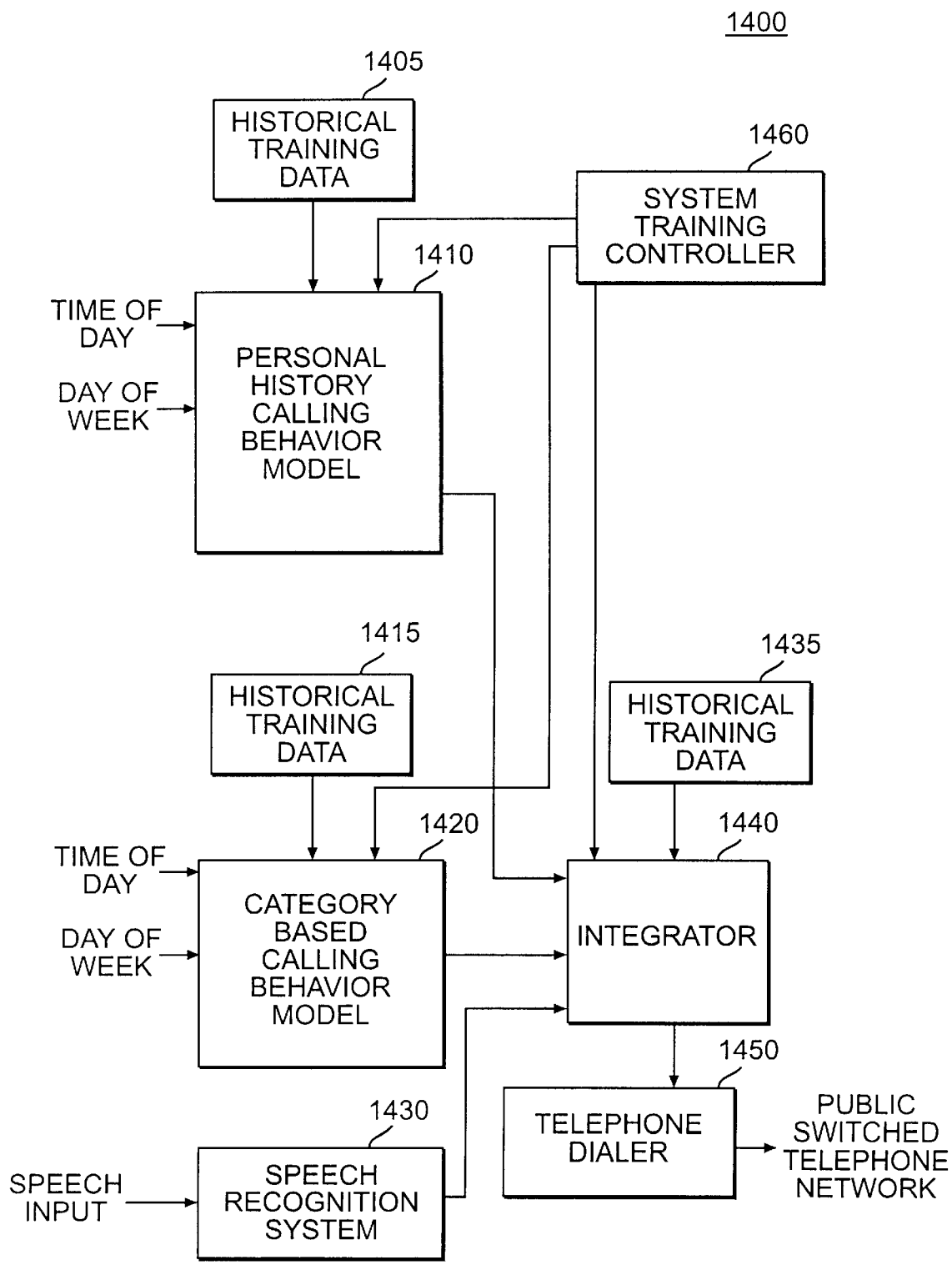
FIG. 14 is a block diagram of the software components for the system in FIG. 13.

FIG. 14 shows a block diagram of the software components for the PBX-based voice-dialing system 1400 implemented using server 1300. Voice-dialing system 1400 consists of four primary components: (1) component 1410 that models the user's calling behavior based on the user's personal history of calls, (2) component 1420 models the calling behavior of groups of people at a physical or virtual site based on a sitewide history of calls between numbers that are defined in particular categories, (3) speech recognition system 1430, which may use conventional techniques, a neural network, or a hybrid approach, and (4) integrator component 1440 that integrates the outputs of the first three components to produce the best estimate of the name (and number) the user desires to call.

Also included is a telephone dialer 1450 that looks up the actual telephone number in a table and dials it. Finally, a system training controller 1460 trains the networks 1410, 1420, and 1440. Both calling behavior model component 1410 and the integrator 1440 are preferably implemented as neural networks and have historical training data 1405 and 1435, respectively, that are maintained to continue training the neural networks when appropriate.

The personal history calling behavior model 1410 is identical to the component 320 used in voice-dialing 300 (FIG. 3), and its architecture is shown in FIG. 4. The category-based call behavior model 1420 also tries to predict the likelihood that a given number will be called for a given calling number, but the method used is very different.

In general, all telephone numbers in the PBX system at a given site are divided into categories according to the organization of the institution. For example, each department or other group in an institution may be a different category. Processor 1400 records all calls from one PBX number to another over a period of time and stores them in a database of historical training data 1415, identifies the appropriate category for each incoming and outgoing number, and then trains the network. The network can therefore give an input category, generate an output signal for each category that predicts the likelihood of a number in the category being called. The output category is then converted to specific numbers and provided as input to integrator 1440.

The speech input from the person saying the name of the number to be dialed is processed by speech processor component 1430 and then fed into integrator network 1440. The historical training data 1435 for integrator network 1435 preferably has the same as the fields for speech recognition match quality as shown in FIG. 8.

These values are used together with the output values from the category-based calling behavior model component 1420 to train integrator network 1440. A fixed number, such as 0.9, which represents the assumed value of the output of personal history calling behavior network 1410 just after a call is made, is also used to train integrator network 1440.

3. Category-Based Calling Behavior Neural Network

Figure 15:
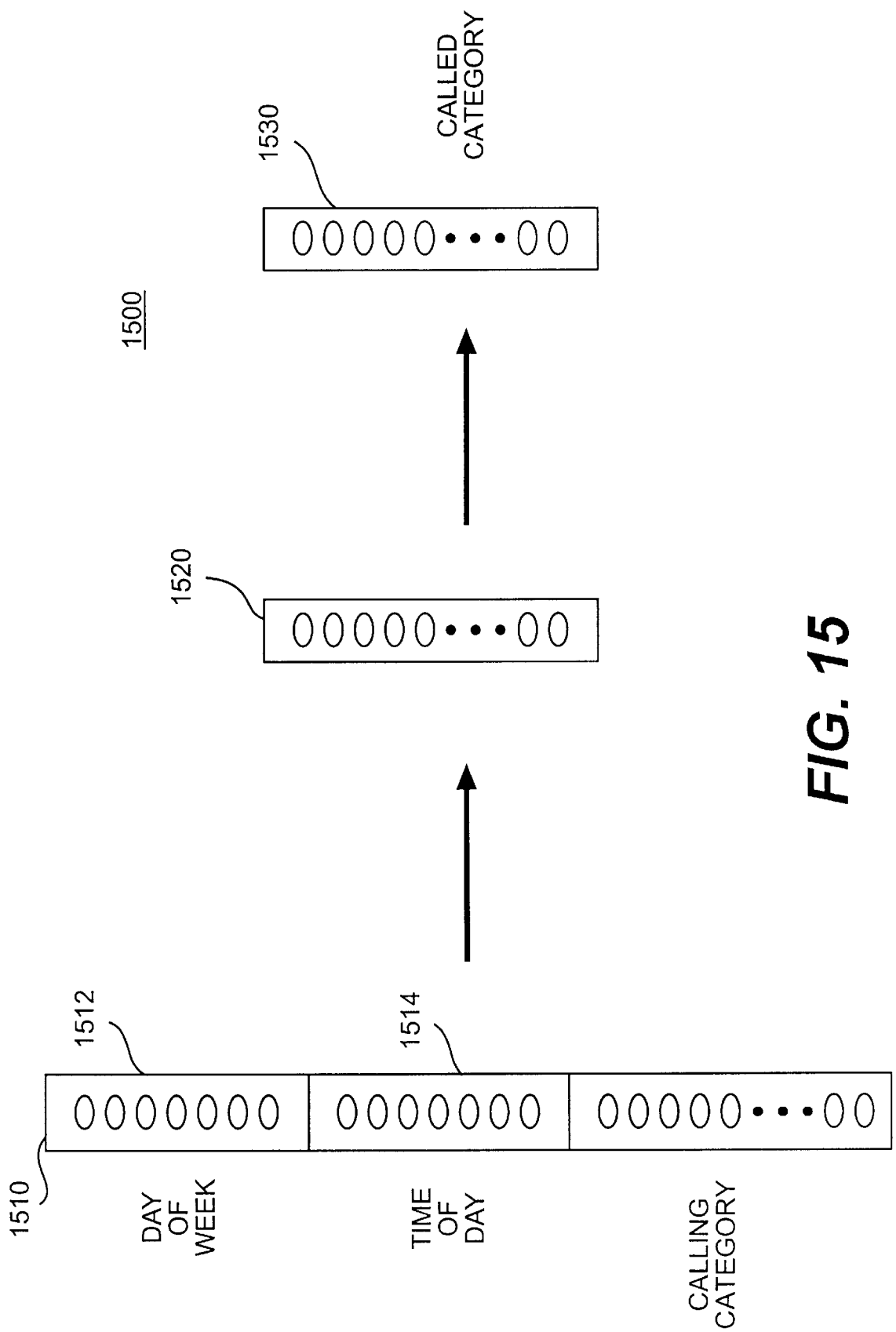
FIG. 15 is a diagram used to explain the architecture of a category-based calling behavior neural network for the system in FIG. 13.

FIG. 15 shows the architecture of category based calling behavior neural network 1500. Neural network 1500 is used by component 1420 in the block diagram of FIG. 14. Network 1500 is a three-layer feedforward neural network consisting of an input layer 1510, hidden layer 1520, and output layer 1530. The network architecture is similar to network 400 shown in FIG. 4, except for the differences indicated below.

Input layer 1510 consists of three groups of input units. One group 1512 encodes the current day of the week, and consists of seven units, one for each day of the week. The second group 1514 encodes the current time of day and consists of seven units (midnight–6 am, 6–9 am, 9–12 am, 12–1, 1–4 pm, 4–6 pm, 6–12 pm). The third group 1516 of input units consists of one unit for each organizational category defined in the voice-dialing system 1400. Training is done from a set of examples of calls in which the telephone numbers for the calling and called numbers are converted to categories. Thus, each training example is composed of a day of the week, time of day, calling number category, and called number category.

An alternative embodiment uses an architecture, and resulting training data, that eliminates the day of the week and time of day inputs to reduce computational requirements. Once the network 1500 is trained, it is activated by providing it with the current day of week and time of day, and the organizational category of the number that the particular call is from. Network 1500 predicts the likelihood of calls to numbers in particular categories, and, by means of table lookup, the likelihood of calls to specific numbers.

An alternative method of implementation, the model is constructed by creating a table that maintains a count of calls in each N×N combination, where N is the number of categories of numbers. A given call from a number in one category to another results in an increment in the appropriate count. When a call is initiated from a particular number, the category is determined by a table lookup, and a number indicating the relative likelihood that the call would be made to a number in particular categories is completed from the normalized counts and provided as outputs from the model.

Training is done in a manner similar to that for integrator 350 for voice-dialing system 300 (see FIG. 5), with two exceptions. First, two predictive models are used instead of one, and second, integrator 1440 is used to weight the contribution of the two predictive models on the basis of which is a better predictor in a given case, and weighting the contribution of the speech processor 1430. The integrator network could also be replaced with a simple numerical algorithm that contained fixed weights, that simply computed a weighted average of the outputs of the three components, albeit with lesser performance.

In an alternative embodiment, a model of the frequency of calls to particular numbers at the given site is used in addition to, or instead of, the other models. Such a model is implemented with a neural network architecture that is similar to calling behavior model network 400 shown in FIG. 4, with the output units representing the entire set of numbers at the site rather than the numbers in a personal directory. This network has its historical training data created in a manner analogous to calling behavior model shown in FIGS. 6a and 6b.

Training the network is also done in a manner analogous to the calling behavior model as shown in FIG. 10, except that the steps of selecting an example probabilistically according to the number of days since the example calls are made are not used. All examples, however, are used.

An alternative method to implement the model is to simply count the number of calls to particular destination numbers and produce an output reflected by this proportion of calls. This would not capture interactions of calling patterns with the day of the week and the time of day, however.

Many alternatives exist for the overall architecture of the system, given the three possible models of personal history calling behavior model, category-based calling behavior model, and frequency-of-destination number model. An architecture can also be constructed by combining the speech recognition component 1430 with any one of the other calling behavior models, any two of them, or all three. The category-based calling behavior model component 1420 and frequency-of-destination number model require a relatively short period of time for training. Once trained, these networks are available for all users to train the integrator network for specific users and to predict the call likelihoods for specific users. In contrast, each user has a personal history calling behavior model and integrator network devoted specifically to that user.

Figure 16:
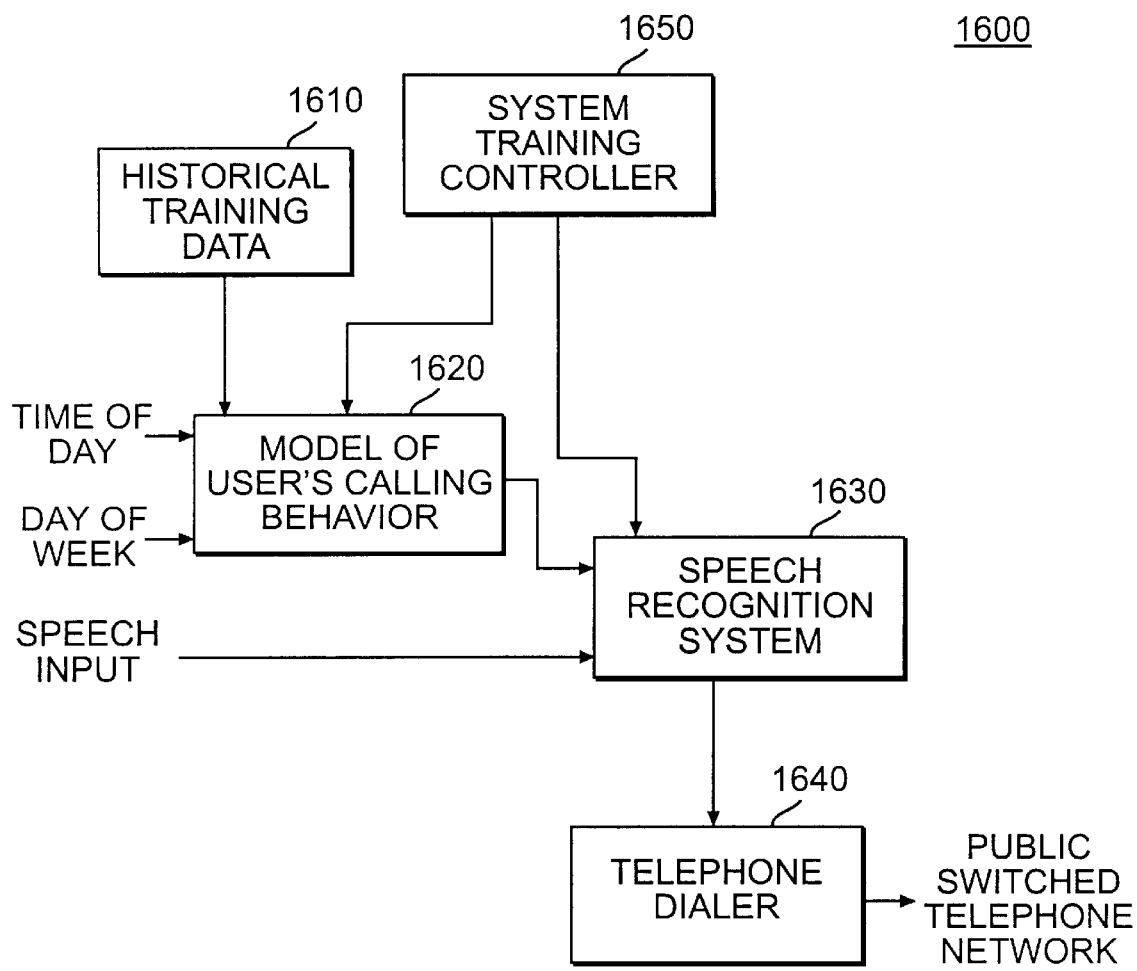
FIG. 16 shows a block diagram of an alternative architecture for the voice-dialing system that was previously shown in FIG. 3.

FIG. 16 shows a block diagram of an alternative architecture for the voice-dialing system that was previously shown in FIG. 3. FIG. 16 shows software system 1600 executed by microprocessor 140. Software system 1600 may be stored on hard disk 160. This alternative architecture is typically computationally faster than that shown in FIG. 3.

System 1600 consists of two principal components: a model of the user's calling behavior 1620 and a speech recognition system 1630. System 1600 also includes a telephone dialer 1640 that looks up the actual telephone number in a table and dials it. System training controller 1650 trains the calling behavior model 1620, using historical training data 1610. System training controller 1650 works as described in FIGS. 9 and 10, except that only the calling behavior network, not the integrator, is trained. Calling behavior model 1620 preferably includes a neural network and uses historical training data 1610 that is maintained to continue training the neural network when appropriate.

When a user picks up the handset of telephone 120 or dials in to the workstation 110 from a remote telephone and identifies himself or herself, microprocessor 140 reads in the weights of the user's calling behavior model 1620 from hard disk 160 and determines the current time and day of the week and provides this to the calling behavior model. The calling behavior model is then computed from these inputs and provides at its outputs a prediction of the liklihood that the user will call each telephone number included in the model. These predictions are provided to the speech recognition system 1630.

When the user speaks the name of the person to be called, speech recognition system 1630 processes the input speech data and attempts to match it against the set of stored representations, typically sequences of phonemes, that represent each name in the database. Unlike the case of the system 300, however, speech recognition system 1630 also takes into account context information, in particular the likelihood of calling particular telephone numbers, that is associated with each name in the database. The provision of this information to the speech recognition system 1630 allows that system to quickly eliminate processing for alternatives that have both a low liklihood of being called and have low similarity to the target sequence of phonemes, resulting in increased computational efficiency and also faster response time.

This alternative architecture requires the use of a speech recognition system, which can be a commercially available speech recognition "engine," that includes the capability of having word and phrase recognition driven by higher-level context information. An example of such a system is the "Watson" speech recognition system that is sold as a product by AT&T in the United States.

Speech recognition system 1630 produces sets of floating point numbers, each representing the extent to which there is a match between the speech input and the stored representation for the name associated with each telephone number, taking into account the biasing information provided by the calling behavior model. Commercially available speech recognition engines such as the "Watson" engine referred to above typically produce an output consisting of the "N best" matches of names in the database for which the match (including biasing information) was above a given threshold value, with a quality measure for each. The number with the highest quality can be dialed immediately, or the list, in order of quality, can be used for selecting the best name and number to be provided to the user for confirmation in the protocol indicated in FIG. 2.

The alternative architecture shown in FIG. 16 can also be applied to the PBX server embodiment shown in FIGS. 13–15. In this case the block diagram of FIG. 14 is modified in a manner similar to the modification of FIG. 3, with both the personal history calling behavior model 1410 and the category based calling behavior model 1420 providing its outputs to a speech recognition system 1430. Speech recognition system 1430 would require a speech engine capable of being context driven, and its output would feed directly into telephone dialer 1450, with integrator 1440 and historical training data 1435 being eliminated.

C. Conclusion

The present invention thus provides a faster and more accurate voice-dialing system by building and maintaining a model of the calling behavior of an individual and using this model to increase the performance of the automatic speech recognition system that matches incoming spoken names with names stored in a directory. The voice-dialing system includes a component that models the user's calling behavior, a component that processes incoming speech and matches it against representations of the names in the directory, and a component that integrates the outputs of the first two components to produce the name that the user most likely desires to call. The user calling behavior model component consists of a multilayer feedforward neural network that uses the backward propagation learning algorithm. The inputs to the neural network accept the current date and time, while the output of the network provides a signal for each telephone number in the directory. The neural network is trained with a database of telephone numbers that have been received or called by the user along with the date and time of the call, whether the call was incoming or outgoing, how it was answered, and the duration of the call. Full retraining of the network is preferably done daily, typically during the early morning hours or when the network is not is use. Example telephone calls are selected for training probabilistically, with the probability that a given call in the set will be used in a given training trial a monotonically decreasing function of the time since that call was made.

The component of the system that integrates the outputs of the first two components also consists of a multilayer feedforward neural network using backward propagation. The inputs to this neural network include one input for each telephone number in the directory from the output of the calling behavior model network, and one input for each telephone number from the output of the speech recognizer. The system is trained by a database of telephone numbers that have been dialed by voice, with each training example including those names (and associated numbers) that most closely match the speech that resulted in the call.

The present invention also facilitates fast and accurate voice-dialing within a site using a PBX system. According to this approach, the voice-dialing system uses three neural networks for a given individual. One neural network is common to all individuals of the organization and implements a predictive model of calling between individuals of the organization. This neural network is a multilayer feedforward neural network that uses the backward propagation learning algorithm. Every telephone number in the organization is associated with a category, with the category assignment made according to the structure of the organization at the site. The common network contains an input unit for each category and an output unit for each category. Training of the network is done with a list of telephone calls from one number to another over a relatively short period of time, such as a week, with each number converted to the appropriate category for that number before being applied to train the network.

The second neural network creates a model of the calling behavior for the specific individual, and its architecture and method of training is similar to that for user's calling behavior model, except that examples are not selected probabilistically based on the elapsed time since the example call was made. The third neural network integrates together information from the first two networks and the speech recognition system to predict the likelihood of calls to particular numbers.

The foregoing description of a preferred embodiment of the invention has been presented for purposes of illustration and description. It is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A method for assisting voice-dialing comprising the steps of:

receiving voice input from a user representing a name corresponding to a desired telephone number;

predicting a likelihood of the user calling telephone numbers based on a model of the user's calling behavior over time period by applying weights such that recent calling behavior is favored over previous calling behavior; and determining the desired telephone number according to the predicted likelihood of the user calling the telephone number corresponding to stored names that most closely match the voice input.

2. The method of claim 1, wherein the model of the user's calling behavior includes weights determined from previous calls by the user to at least one of the telephone numbers, and wherein the determining step includes the substep of:

applying the weights to order telephone numbers corresponding to the selected names.

3. The method of claim 1, wherein the model of the user's calling behavior includes weights determined from previous calls that the user received from at least one of the telephone numbers, and wherein the determining step includes the substep of:

applying the weighting factors to order telephone numbers corresponding to the selected names.

4. The method of claim 1, wherein the determining step includes the substep of:

generating a set of the telephone numbers that are most likely the desired telephone number.

5. The method of claim 1, wherein the determining step includes the substep of:

ordering a set of the telephone numbers according to the predicted likelihood that each telephone number in the set is the desired telephone number.

6. The method of claim 2, wherein the determining step includes the substep of:

ordering the telephone numbers associated with the selected names according to the predicted likelihood that each telephone number in the set is the desired telephone number.

7. The method of claim 3, wherein the determining step includes the substep of:

ordering the telephone numbers associated with the selected names according to the predicted likelihood that each telephone number in the set is the desired telephone number.

8. The method of claim 4, wherein the generating step includes the substeps of:

prompting the user to select one of the telephone numbers from the set; and initiating a telephone call to the selected telephone number.

9. The method of claim 1 further comprising the step of:

dialing the desired telephone number.

10. The method of claim 1 further comprising the step of:

outputting the desired telephone number in a manner perceptible to the user.

11. The method of claim 1, wherein the model of the user's calling behavior comprises an abstract representation based on the user's environment and actions with respect to initiating telephone calls, and wherein the predicting step includes the substep of:

examining the abstract representation for indications that the user intends to call each of the telephone numbers.

12. The method of claim 1, wherein the model of the user's calling behavior comprises an adaptive model that is alterable based on the user's environment and actions with respect to initiating telephone calls, and wherein the predicting step includes the substep of:

examining the adapative model for indications that the user intends to call each of the telephone numbers.

13. The method of claim 1, wherein the model of the user's calling behavior comprises a neural network and wherein the predicting step includes the substep of:

examining the neural network for indications that the user intends to call each of the telephone numbers.

14. The method of claim 1, wherein a speech recognition system is used to receive the voice input, and wherein the determining step includes the substep of:

integrating the calling behavior model with accuracy measures for the speech recognition system.

15. The method of claim 1, further comprising the step of:

training the model of the user's calling behavior with previous calls from the user to each of the telephone numbers.

16. The method of claim 1, further comprising the step of:

training the model of the user's calling behavior with previous calls received by the user from each of the telephone numbers.

17. The method of claim 4, wherein the generating step includes the substeps of:

selecting a name associated with one of the telephone numbers in the set;

presenting the selected name to the user; and waiting for a response from the user indicating whether the selected name corresponds to the desired telephone number.

18. The method of claim 17, wherein the waiting step includes the substep of:

determining whether a predetermined period of time has passed since the user was presented with the selected name.

19. The method of claim 17, wherein the waiting step includes the substep of:

interpreting a lack of response as meaning that the selected name corresponds to the desired telephone number.

20. The method of claim 1, further comprising the step of:

building a training set including information related to at least one previous call.

21. The method of claim 20, further comprising the step of:

at a predetermined time, modifying the model of the user's calling behavior in accordance with the training set.

22. The method of claim 21, wherein the model of the user's calling behavior includes weights determined from previous calls by the user to at least one of the telephone numbers, and wherein the modifying step includes the substep of:

altering the weights of the user's calling beavior model to reflect the information related to the previous call.

23. Voice-dialing apparatus comprising:

a receiver configured to receive voice input from a user representing a name corresponding to a desired telephone number;

a predicting component configured to predict a likelihood of the user calling telephone numbers based on a model of the user's calling behavior over time period by applying weights such that recent calling behavior is favored over previous calling behavior; and a determining component configured to determine the desired telephone number according to the predicted likelihood of the user calling the telephone number corresponding to each selected name.

24. The apparatus of claim 23, wherein the model of the user's calling behavior includes weights determined from previous calls by the user to at least one of the telephone numbers, and wherein the determining component includes:

means for applying the weights to order telephone numbers corresponding to the selected names.

25. The apparatus of claim 23, wherein the model of the user's calling behavior includes weights determined from previous calls that the user received from at least one of the telephone numbers, and wherein the determining component includes:

means for applying the weighting factors to order telephone numbers corresponding to the selected names.

26. The apparatus of claim 23, wherein the determining component includes:

means for generating a set of the telephone numbers that are most likely the desired telephone number.

27. The apparatus of claim 23, wherein the determining component includes:

means for ordering a set of the telephone numbers according to the predicted likelihood that each telephone number in the set is the desired telephone number.

28. The apparatus of claim 24, wherein the determining component includes:

means for ordering the telephone numbers associated with the selected names according to the predicted likelihood that each telephone number in the set is the desired telephone number.

29. The apparatus of claim 25, wherein the determining component includes:

means for ordering the telephone numbers associated with the selected names according to the predicted likelihood that each telephone number in the set is the desired telephone number.

30. The method of claim 26, wherein the generating means includes:

means for prompting the user to select one of the telephone numbers from the set; and means for initiating a telephone call to the selected telephone number.

31. The apparatus of claim 23 further comprising:

means for dialing the desired telephone number.

32. The apparatus of claim 23 further comprising:

means for outputting the desired telephone number in a manner perceptible to the user.

33. The apparatus of claim 23, wherein the model of the user's calling behavior comprises an abstract representation based on the user's environment and actions with respect to initiating telephone calls, and wherein the predicting component includes:

means for examining the abstract representation for indications that the user intends to call each of the telephone numbers.

34. The apparatus of claim 23, wherein the model of the user's calling behavior comprises an adaptive model that is alterable based on the user's environment and actions with respect to initiating telephone calls, and wherein the predicting component includes:

means for examining the adapative model for indications that the user intends to call each of the telephone numbers.

35. The apparatus of claim 23, wherein the model of the user's calling behavior comprises a neural network and wherein the predicting component includes:

means for examining the neural network for indications that the user intends to call each of the telephone numbers.

36. The apparatus of claim 23, wherein a speech recognition system is used to receive the voice input, and wherein the determining component includes:

means for integrating the calling behavior model with accuracy measures for the speech recognition system.

37. The apparatus of claim 23, further comprising:

means for training the model of the user's calling behavior with previous calls from the user to each of the telephone numbers.

38. The apparatus of claim 23, further comprising:

means for training the model of the user's calling behavior with previous calls received by the user from each of the telephone numbers.

39. The apparatus of claim 26, wherein the generating means includes:

means for selecting a name associated with one of the telephone numbers in the set;

means for presenting the selected name to the user; and means for waiting for a response from the user indicating whether the selected name corresponds to the desired telephone number.

40. The apparatus of claim 39, wherein the waiting means includes:

means for determining whether a predetermined period of time has passed since the user was presented with the selected name.

41. The apparatus of claim 39, wherein the waiting step includes:

means for interpreting a lack of response as meaning that the selected name corresponds to the desired telephone number.

42. The apparatus of claim 23, further comprising:

means for building a training set including information related to at least one previous call.

43. The apparatus of claim 23, further comprising:

means for modifying the model of the user's calling behavior in accordance with the training set at a predetermined time.

44. The apparatus of claim 43, wherein the model of the user's calling behavior includes weights determined from previous calls by the user to at least one of the telephone numbers, and wherein the modifying means includes:

means for altering the weights of the user's calling beavior model to reflect the information related to the previous call.

* * * * *

UNITED STATES PATENT AND TRADEMARK OFFICE
CERTIFICATE OF CORRECTION

PATENT NO. : 6,167,117

DATED : December 26, 2000

INVENTOR(S) : CRAIG A. WILL

IN THE CLAIMS:

Claim 1, col. 22, line 14, change "over time" to --over a time--.
Claim 22, col. 23, line 66, change "beavior" to --behavior--.
Claim 23, col. 24, line 7, change "over time" to --over a time--.
Claim 44, col. 26, line 29, change "bevior" to --behavior--.

Signed and Sealed this

Twenty-ninth Day of May, 2001

*Attest:*

NICHOLAS P. GODICI

*Attesting Officer*     *Acting Director of the United States Patent and Trademark Office*